(12) United States Patent
Hodge et al.

(10) Patent No.: US 11,895,439 B2
(45) Date of Patent: Feb. 6, 2024

(54) SYSTEMS AND METHODS FOR AUTHENTICATING AND PRESENTING VIDEO EVIDENCE

(71) Applicant: Xirgo Technologies, LLC, Camarillo, CA (US)

(72) Inventors: Andrew Hodge, Palo Alto, CA (US); Nathan Ackerman, Palo Alto, CA (US); Jean-Paul Labrosse, Altadena, CA (US)

(73) Assignee: Xirgo Technologies, LLC, Camarillo, CA (US)

( * ) Notice: Subject to any disclaimer, the term of this patent is extended or adjusted under 35 U.S.C. 154(b) by 261 days.

(21) Appl. No.: 16/984,879

(22) Filed: Aug. 4, 2020

(65) Prior Publication Data

US 2021/0037216 A1 Feb. 4, 2021

Related U.S. Application Data

(63) Continuation of application No. 15/853,321, filed on Dec. 22, 2017, now Pat. No. 10,785,453, which is a
(Continued)

(51) Int. Cl.
*H04N 7/18* (2006.01)
*H04N 21/2347* (2011.01)
(Continued)

(52) U.S. Cl.
CPC ........... *H04N 7/181* (2013.01); *G06F 16/787* (2019.01); *G06F 16/7837* (2019.01);
(Continued)

(58) Field of Classification Search
USPC .................................................. 386/248, 259
See application file for complete search history.

(56) References Cited

U.S. PATENT DOCUMENTS

| 7,428,585 | B1 | 9/2008 | Owens et al. |
| 8,984,405 | B1 * | 3/2015 | Geller .................... G11B 27/34 |
| | | | 715/753 |

(Continued)

OTHER PUBLICATIONS

Safety Track, "UCIT Live HD Dash Cam, Vehicle Video Recorder Live View Player User Guide", Sep. 2016, pp. 14.
(Continued)

*Primary Examiner* — Nigar Chowdhury
(74) *Attorney, Agent, or Firm* — Lee & Hayes, P.C.

(57) ABSTRACT

A method for automatically authenticating unknown video data based on known video data stored at a client server is provided, wherein unknown and known video data each are made up of segments and include metadata, a hash message digest, and a serial code. The method involves selecting a first segment of the unknown video and locating the serial code within the first segment of the unknown video data. The serial code is used to locate a corresponding first segment in the known video data. The first segment may include a known hash message digest. A new hash message digest for the first segment of the unknown video data is generated and compared with the known hash message digest. If they match, the segment of unknown video data is authentic.

19 Claims, 15 Drawing Sheets

Related U.S. Application Data continuation-in-part of application No. PCT/US2017/050991, filed on Sep. 11, 2017.

(60) Provisional application No. 62/412,764, filed on Oct. 25, 2016.

(51) Int. Cl.

| | | |
|---|---|---|
| *G08B 13/196* | (2006.01) | |
| *G06K 19/06* | (2006.01) | |
| *G06Q 40/08* | (2012.01) | |
| *G06Q 50/18* | (2012.01) | |
| *H04N 21/44* | (2011.01) | |
| *G06V 20/52* | (2022.01) | |
| *H04N 23/667* | (2023.01) | |
| *G11B 20/00* | (2006.01) | |
| *H04N 21/433* | (2011.01) | |
| *H04N 21/472* | (2011.01) | |
| *H04N 21/482* | (2011.01) | |
| *H04N 21/61* | (2011.01) | |
| *G06F 16/783* | (2019.01) | |
| *G06F 16/787* | (2019.01) | |

(52) U.S. Cl.
CPC ....... *G06K 19/06009* (2013.01); *G06Q 40/08* (2013.01); *G06Q 50/18* (2013.01); *G06V 20/52* (2022.01); *G08B 13/19613* (2013.01); *G08B 13/19647* (2013.01); *G08B 13/19658* (2013.01); *G08B 13/19684* (2013.01); *G11B 20/0021* (2013.01); *H04N 21/2347* (2013.01); *H04N 21/4334* (2013.01); *H04N 21/44004* (2013.01); *H04N 21/472* (2013.01); *H04N 21/4825* (2013.01); *H04N 21/6125* (2013.01); *H04N 23/667* (2023.01)

(56) References Cited

U.S. PATENT DOCUMENTS

| | | | |
|---|---|---|---|
| 9,119,068 B1 | 8/2015 | Hubble | |
| 9,369,768 B1 * | 6/2016 | Mandel | H04N 21/4788 |
| 9,418,702 B1 * | 8/2016 | Arepalli | G11B 27/036 |
| 10,142,496 B1 * | 11/2018 | Rao | H04N 7/14 |
| 10,249,069 B1 * | 4/2019 | Kerzner | G06V 20/52 |
| 10,490,022 B2 | 11/2019 | Oberberger | |
| 10,733,651 B2 * | 8/2020 | Hansen | G06Q 30/0627 |
| 2005/0240623 A1 * | 10/2005 | Kobza | G06F 16/958 |
| 2005/0254440 A1 * | 11/2005 | Sorrell | H04L 65/1101 |
| | | | 348/14.08 |
| 2006/0072789 A1 * | 4/2006 | Lewiner | G08G 1/054 |
| | | | 382/104 |
| 2006/0271545 A1 * | 11/2006 | Youn | G06F 16/951 |
| 2007/0106897 A1 * | 5/2007 | Kulakowski | H04L 9/083 |
| | | | 713/168 |
| 2009/0113472 A1 | 4/2009 | Sheth et al. | |
| 2009/0133089 A1 | 5/2009 | Ku et al. | |
| 2011/0004832 A1 | 1/2011 | Canal et al. | |
| 2011/0092221 A1 | 4/2011 | Zubas et al. | |
| 2011/0154385 A1 * | 6/2011 | Price | G10L 17/00 |
| | | | 725/12 |
| 2012/0182380 A1 | 7/2012 | Ohmae et al. | |
| 2013/0227414 A1 * | 8/2013 | Hwang | G06F 3/04842 |
| | | | 715/719 |
| 2013/0267204 A1 * | 10/2013 | Schultz | G06F 21/32 |
| | | | 455/411 |
| 2013/0340057 A1 * | 12/2013 | Kitlyar | G06F 21/36 |
| | | | 726/6 |
| 2014/0044258 A1 | 2/2014 | Grewal et al. | |
| 2014/0229387 A1 | 8/2014 | Chow | |
| 2014/0254934 A1 | 9/2014 | Horabailu et al. | |
| 2014/0372564 A1 | 12/2014 | Nijim et al. | |
| 2015/0038171 A1 * | 2/2015 | Uilecan | H04W 4/33 |
| | | | 455/456.3 |
| 2015/0082410 A1 | 3/2015 | Fitzgerald et al. | |
| 2015/0085159 A1 | 3/2015 | Sinha et al. | |
| 2015/0205993 A1 * | 7/2015 | Han | G06V 40/13 |
| | | | 345/173 |
| 2016/0080510 A1 | 3/2016 | Dawoud et al. | |
| 2016/0117347 A1 | 4/2016 | Nielsen et al. | |
| 2016/0117510 A1 | 4/2016 | Yi et al. | |
| 2016/0162873 A1 | 6/2016 | Zhou et al. | |
| 2016/0224837 A1 | 8/2016 | Lipert et al. | |
| 2016/0232579 A1 * | 8/2016 | Fahnestock | G06Q 30/0246 |
| 2016/0283920 A1 | 9/2016 | Fisher et al. | |
| 2016/0295038 A1 * | 10/2016 | Rao | H04N 1/00214 |
| 2016/0308859 A1 * | 10/2016 | Barry | G06V 40/172 |
| 2016/0353282 A1 * | 12/2016 | Richards | H04W 12/068 |
| 2017/0064384 A1 * | 3/2017 | Sahoo | H04N 21/4335 |
| 2017/0091952 A1 * | 3/2017 | Sun | G06V 10/462 |
| 2017/0257414 A1 * | 9/2017 | Zaletel | H04L 65/764 |
| 2018/0006823 A1 * | 1/2018 | Carbajal | H04L 9/30 |
| 2018/0039788 A1 * | 2/2018 | Leggette | H04L 63/104 |
| 2018/0133583 A1 | 5/2018 | Tran et al. | |
| 2018/0359477 A1 * | 12/2018 | Yang | H04N 19/136 |
| 2022/0092309 A1 * | 3/2022 | Rao | H04N 7/14 |

OTHER PUBLICATIONS

Safety Track, "UCIT Basic-Live 2 Camera, Vehicle Video Recorder Installation Manual", Jun. 2015, 14 pgs.

* cited by examiner

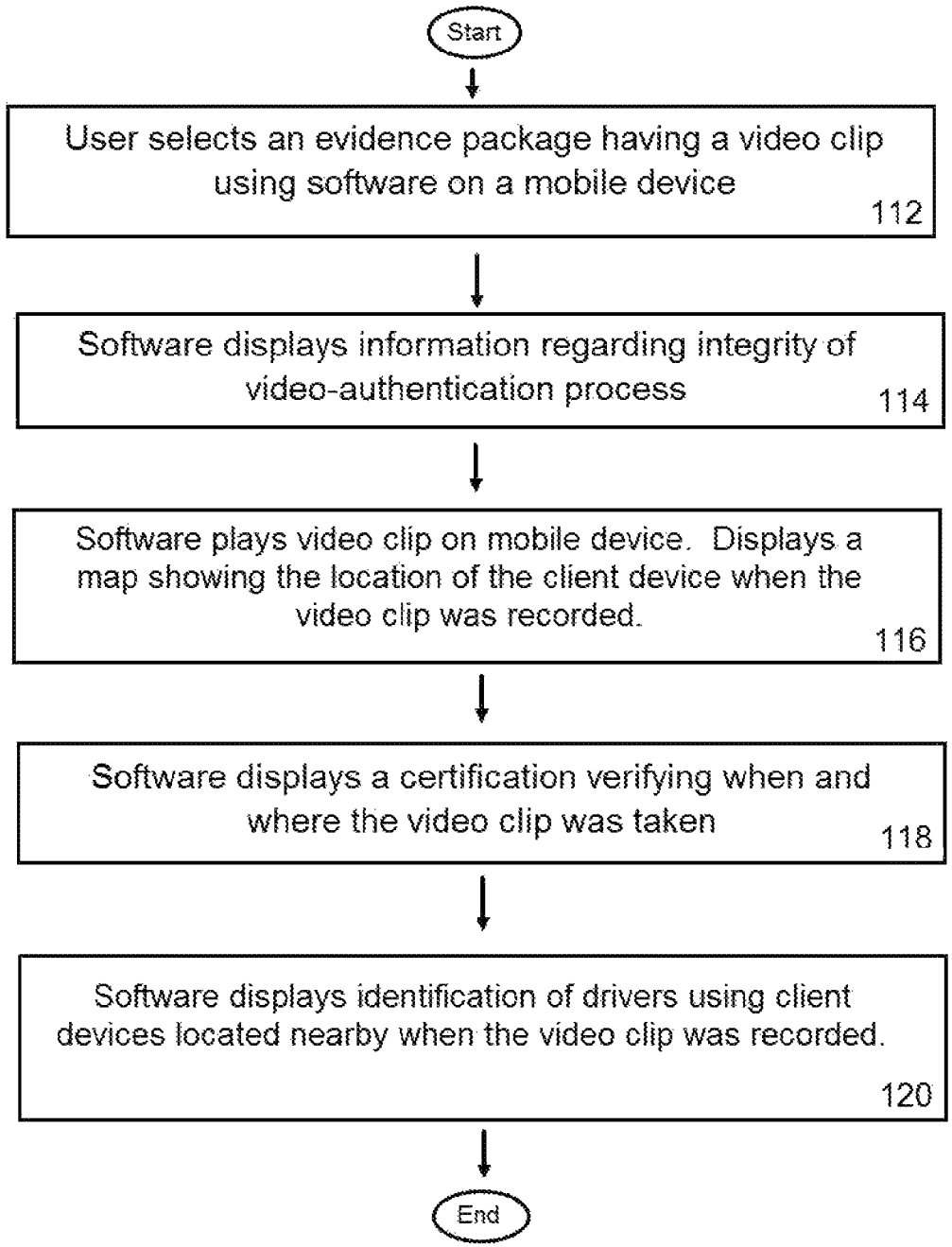

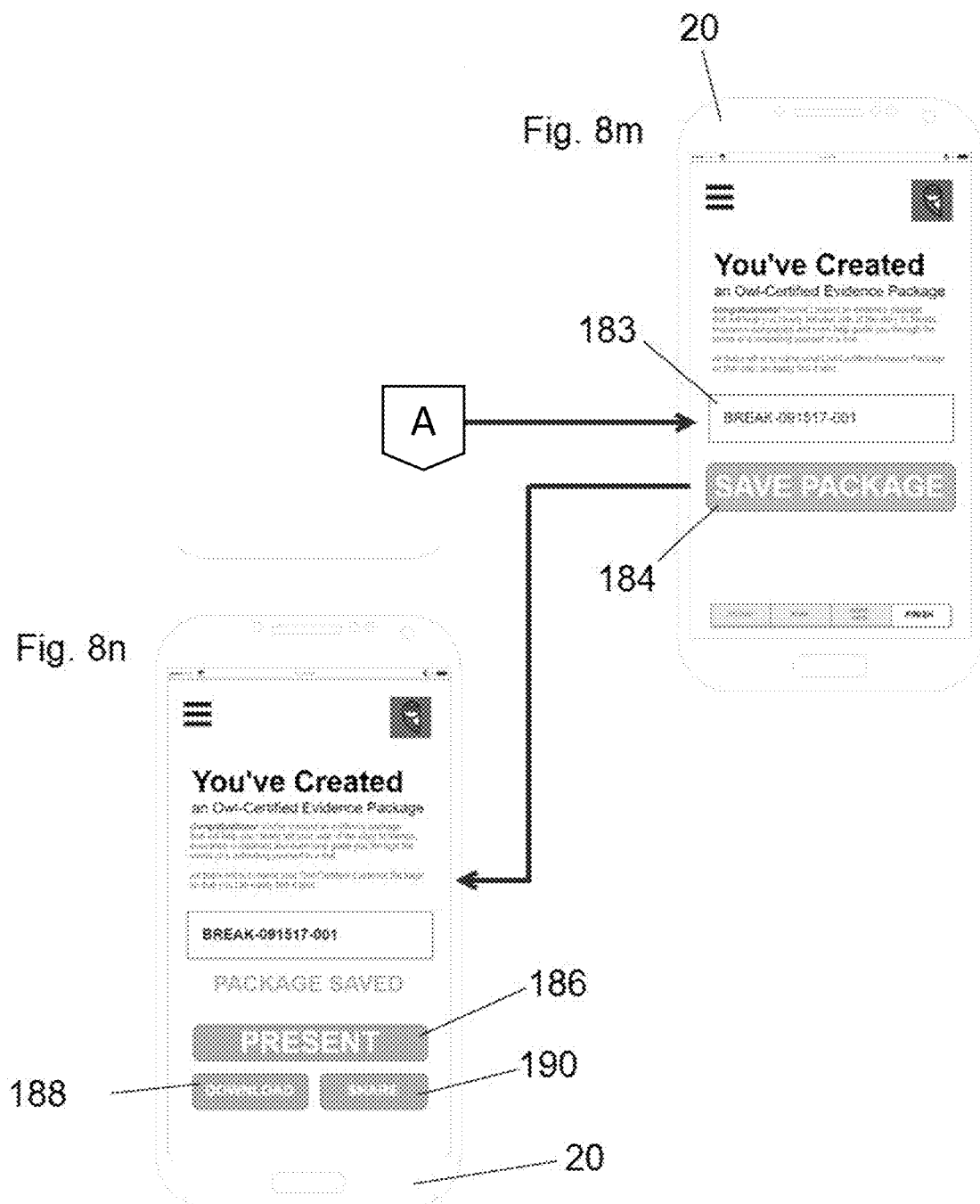

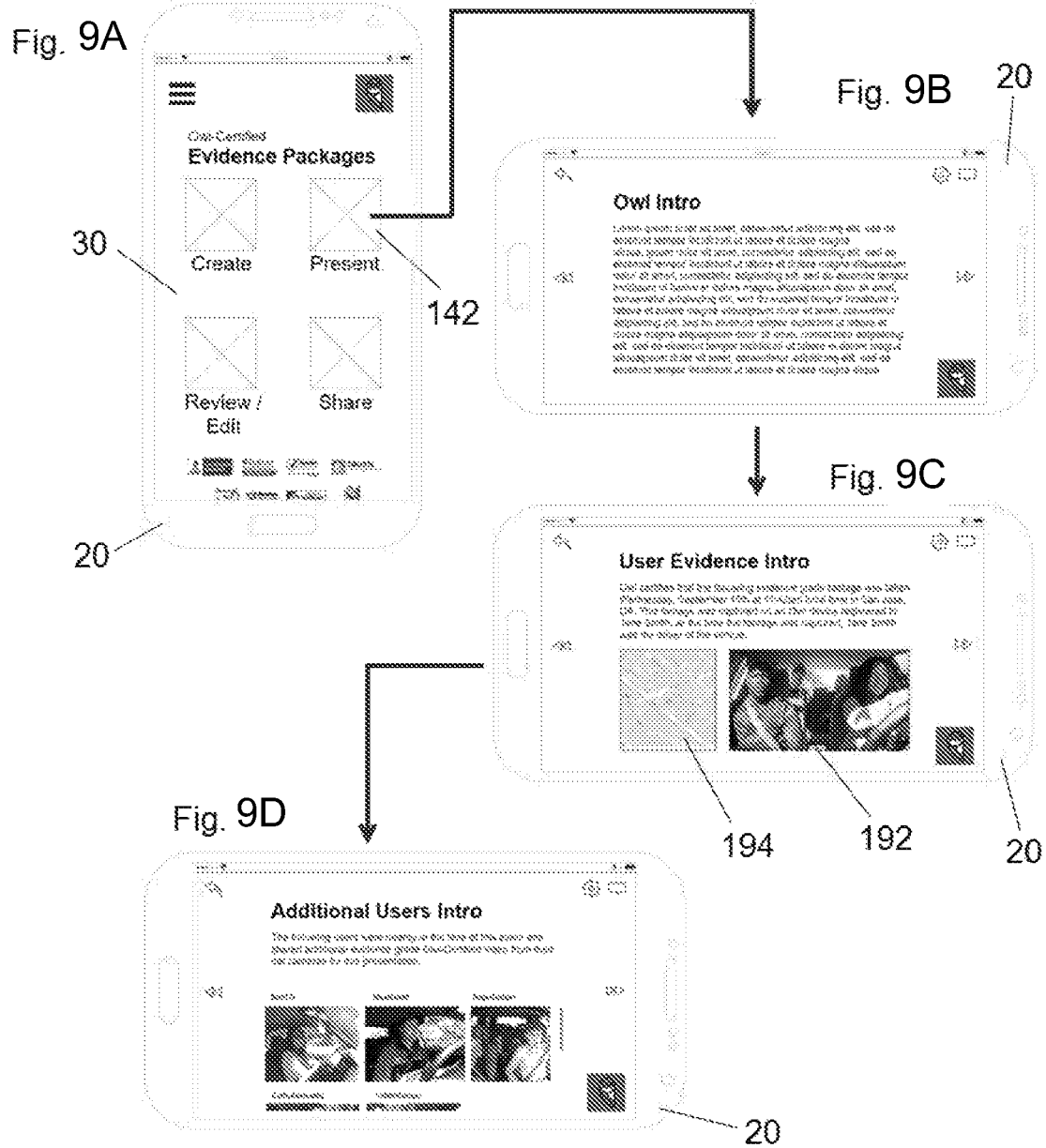

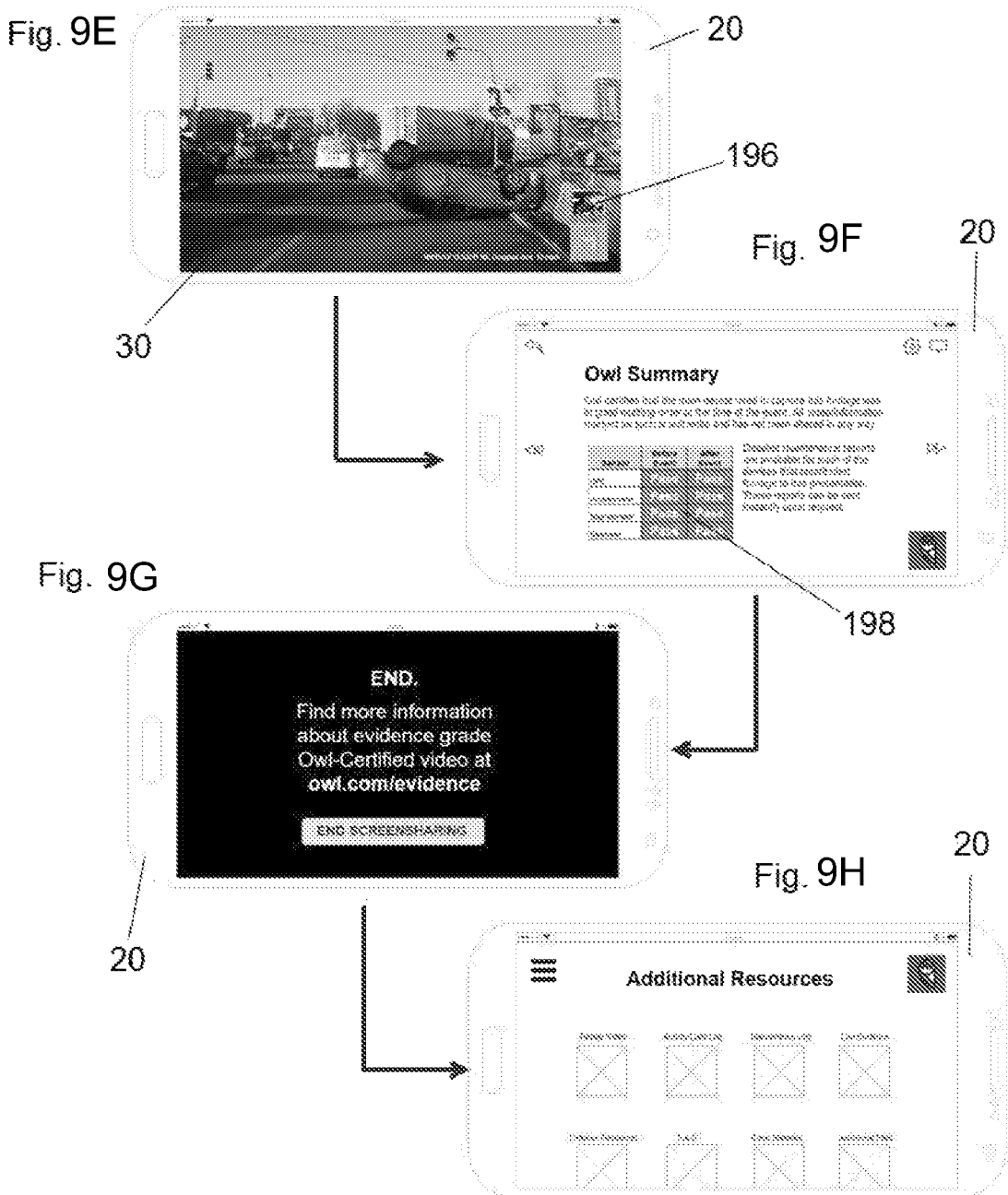

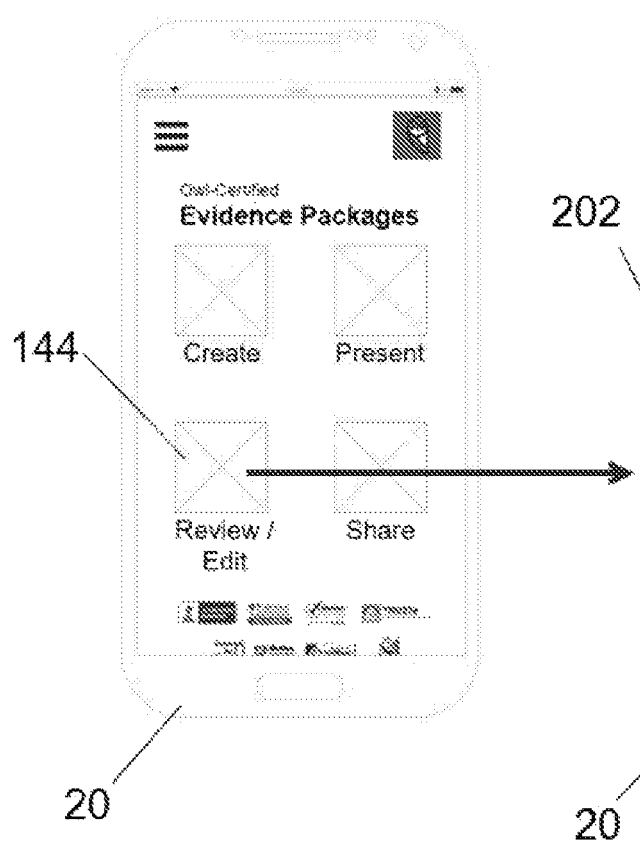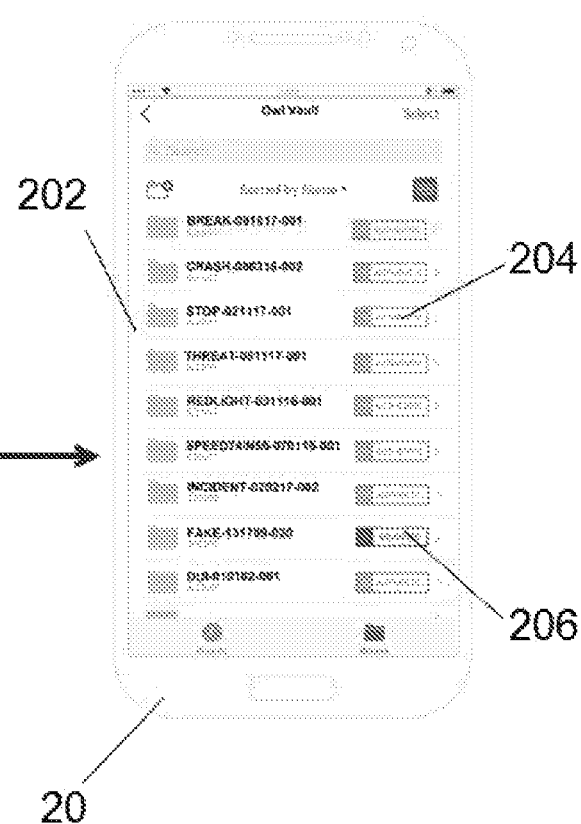

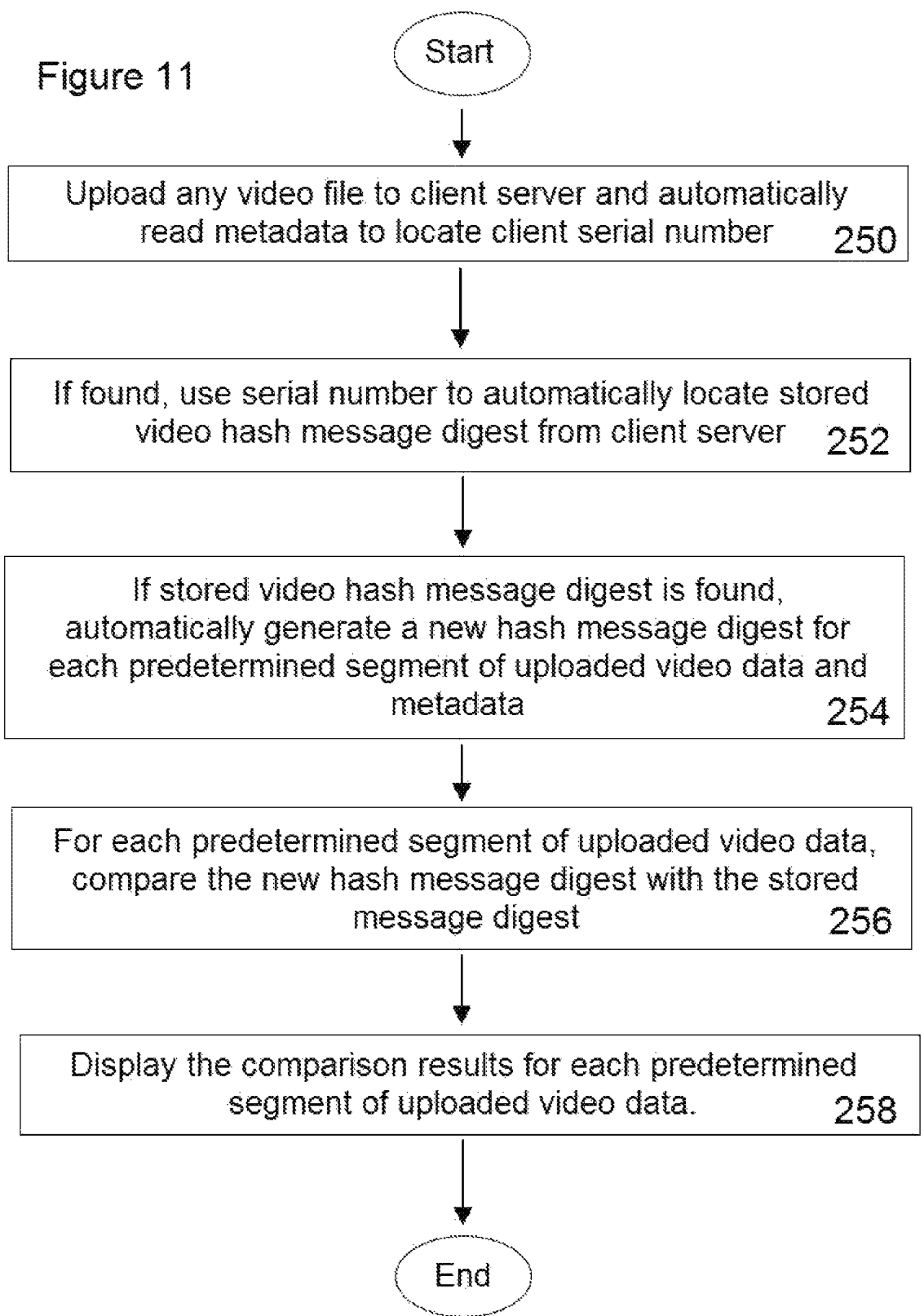

SYSTEMS AND METHODS FOR AUTHENTICATING AND PRESENTING VIDEO EVIDENCE

CROSS-REFERENCE TO RELATED APPLICATIONS

This application is a continuation of U.S. patent application Ser. No. 15/853,321, entitled "Authenticating and Presenting Video Evidence," which is a continuation-in-part of and claims priority to PCT Patent Application No. PCT/US17/50991, entitled "Video-Based Data Collection, Image Capture and Analysis Configuration," filed Sep. 11, 2017, which claims the benefit of U.S. Provisional Application No. 62/412,764, filed Oct. 25, 2016, all of which are hereby incorporated by reference in their entirety.

BACKGROUND OF THE INVENTION

The present invention relates generally to a system for managing the recording, collection and selective presentation of video data, and more particularly, to such a video management system which further includes features to ensure authenticity and features to allow a user to present to others and defend submission of select videos as evidence in a court of law or to other relevant institutions.

Evidence of an accident or crime may take on any of a variety of forms. In recent years, with the proliferation of smartphones having integral digital cameras and other types of readily available hand-held digital cameras, a common form of evidence now is in the form of digital media, such as a digital video recording.

Unfortunately, digital data, such as digital video, can be easily altered or tampered with by unscrupulous persons to change the perception of what appears in the video to serve some other purpose. As a result, introduction of such evidence in any situation of importance, such as in a court of law or when defending an insurance claim, is often subjected to challenges by an opposing side. For example, in a trial, even if ruled admissible and allowed to be presented to a jury, opposing counsel may still be allowed to impeach video evidence by raising doubts regarding the authenticity or lack of tampering of the video data, and if a "seed of doubt" can be planted in the proceedings, then the value of any admitted video evidence will be at risk.

Furthermore, there are many instances wherein a person must defend the authenticity of a video they are submitting or presenting to a court or to an insurance company, or to other official agencies or people and they do not have the benefit of an attorney representing them. For example, in traffic court, usually owing to the relatively low-severity and "cost" of a typical traffic offense, a defendant rarely hires an attorney and just represents him or herself in the court proceedings. In such instance, during a court hearing, for example, a person may want to introduce a video as evidence to show what really happened during the subject incident, but usually does not have the legal training or representation to effectively counter any arguments or refusal by a judge (or other authority) to enter or accept the video as evidence, and as a result, the video evidence may end up being inadmissible and not considered, when it otherwise could.

There are other instances wherein a car-mounted camera, such as a so-called "dash-cam," or "car-camera," records video evidence which includes metadata, such as vehicle speed, whose accuracy may be unverifiable, but wherein the video otherwise includes substantive and authenticated content. In such instance, the entire video may become inadmissible as evidence, owing to the small portion of questionable content affecting the integrity of the whole.

Accordingly, what is needed is a means for determining the integrity of digital video data such that, for example, a judicial system or other person or agency can be presented with sound scientific or technological grounds to prove that what is being submitted is exactly what was originally recorded—a true and accurate reflection.

Another area of concern regards how video evidence is originally recorded to ensure that a particular event of interest, such as an automobile accident, is sufficiently and accurately captured. A car-mounted camera (i.e., car-camera) is an onboard camera that continuously records typically at least a forward view through a vehicle's windshield. The car-camera is typically mounted to the interior windshield or to the top of the dashboard, by suction cup, a mounting bracket, adhesive-tape mount, or some other mounting means. Car-cameras have proven themselves useful at capturing relevant video data of car accidents and other events and often provide useful video evidence.

Unfortunately, a single car-camera can only provide a limited amount of visual information since the camera's lens provides a finite field of view. Also, in the case of an automobile accident, the car-camera itself may become severely damaged or knocked off its mount and be unable to record or "see" the events which take place during and after the impact. This is unfortunate since important visual evidence occurring after the accident may be lost.

Similarly, if an automobile is subject to a forced entry incident (a break in), a car-camera in that car may quickly be stolen, knocked down, or otherwise made inoperative. In this situation, it would be helpful to have video footage from other nearby car-cameras, each showing the incident or surrounding areas from a different view to help piece together the "story" of the incident.

Accordingly, it is a first object of the invention to provide a video capture and management system which overcomes the deficiencies of the prior art.

It is another object of the invention to provide a system to quickly and easily compile authentic video footage from cameras to an electronic mobile device for the purpose of selectively presenting the video footage to others.

It is another object of the invention to provide a system to quickly and easily compile authentic video footage from cameras to an electronic mobile device for the purpose of selectively presenting the video footage to others, including providing advice to a user regarding responses to help convince viewers to accept the video footage as authentic.

It is another object of the invention to provide quick and easy proof of authenticity of a video file and associated metadata and to gather evidence from relevant users, at relevant times, to be used later in overcoming opposing arguments for accepting the video file as authentic.

BRIEF SUMMARY

According to various embodiments of the present invention, a digital media management and evidence report generating system is provided. In one embodiment, the system includes a camera, a local memory, a remote memory, a system to encrypt a subject video, an authenticator to selectively authenticate predetermined sized packets of a subject video at predetermined times and in response to prescribed actions, and means to identify portions of a subject video which are authentic and which are not authentic. According to one embodiment, the camera records a video, which is encrypted, hashed to form message digests, re-encrypted, and then stored in either the local memory or the remote memory, or both, for later access and use.

According to another embodiment of the disclosure, a mobile application is provided on a user's mobile electronic device (e.g., a smartphone) to access any of many stored videos from either the local or remote memory. A selected video is decrypted, automatically authenticated (by generated a new hash message digests and comparing old and new hash files), and played on the user's smart phone. Authenticated and unauthenticated portions of the video may be revealed graphically, for example, using graphic indicator overlays, during playback.

According to another embodiment of the disclosure, the mobile application can create an evidence package which includes video footage showing authentication identifiers and further includes supporting information promoting the integrity and authenticity of the subject video to support the admissibility of the video evidence as authentic video evidence in court proceedings.

According to another embodiment, a method for automatically authenticating unknown video data based on known video data stored at a client server is provided, wherein, unknown and known video data each are made up of segments and include metadata, a hash message digest, and a serial code. The method involves receiving the unknown video data, selecting a first segment of the unknown video and locating the serial code within the first segment of the unknown video data. The serial code may be used to locate a corresponding first segment in the known video data, which may be stored on a server. The corresponding first segment includes a known hash message digest. A new hash message digest for the first segment of the unknown video data is generated and compared with the known hash message digest to determine if there is a match. If so, the segment of unknown video data is deemed authentic. This process may be repeated for multiple segments of an unknown video data recording and the results can be conveyed to a person viewing the unknown video data. The results may be provided graphically, for example by using graphic icons which appear whenever a segment of unknown video data is being played is either authentic, or not authentic. Other formats for providing the authenticity results may be used, for example, sounds which are generated to indicate whether a segment is authentic or not.

The features of described in this disclosure, and the manner of attaining them, will become more apparent and the invention itself will be better understood by reference to the following description of the disclosed embodiments taken in conjunction with the accompanying drawings.

BRIEF DESCRIPTION OF THE SEVERAL VIEWS OF THE DRAWINGS

FIG. 7 is a block diagram showing a method to present the electronic "evidence package" of FIG. 6, according to one embodiment;

FIGS. 9a-9h are illustrative screen views of an exemplary mobile device, showing a select pages of a software application program for presenting an evidence package, according to one embodiment;

FIGS. 10a-10b are illustrative screen views of an exemplary mobile device, showing a select pages of a software application program for reviewing and editing an evidence package, according to one embodiment;

FIG. 11 is a block diagram illustrating a method to automatically authenticate an uploaded video clip, according to one embodiment.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION OF THE INVENTION

The Figures and the following description describe certain embodiments by way of illustration only. One skilled in the art will readily recognize from the following description that other embodiments having varying or alternative structures may be implemented without departing from the principles of the disclosure. Reference will now be made in detail to several embodiments, examples of which are illustrated in the accompanying figures. It is noted that wherever practicable similar or like reference numbers may be used in the figures and may indicate similar or like functionality.

By way of introduction, the present invention relates to a video management system for capturing, storing, authenticating, analyzing, accessing and presenting video files when needed. As described in Applicants' PCT Patent Application, entitled, "Video-Based Data Collection, Image Capture and Analysis Configuration", filed Sep. 11, 2017, having serial number, PCT/US17/50991, the system according to the disclosure, manages video data from one or more of a plurality of client devices, each of which has at least one video camera, a processor, memory, several sensors a cellular communication module and a Bluetooth communication module. Each client device is either mobile—mounted to a vehicle, or mounted to a fixed object so that at least one video camera records video data (with a field of view generally covering the forward view of the vehicle in the case of a vehicle mounted client device). The sensors of each client device are configured to generate metadata. The processor associates the metadata with recorded video data and encrypts the data stream. The processor, at prescribed times, transmits the encrypted video and metadata to a cloud-based server using the cellular communication module. The encrypted video files are stored in a cloud-based server for secured access.

According to the disclosure, when a user requires access to saved video files managed by the cloud-based server, a software application running on a computer device (e.g., a PC, a tablet, or a smartphone) allows the user to quickly and easily access the video and create an evidence package, ready for presentation to a person or submission to an agency, such as an insurance company, or use in a court proceeding.

Figure 1:
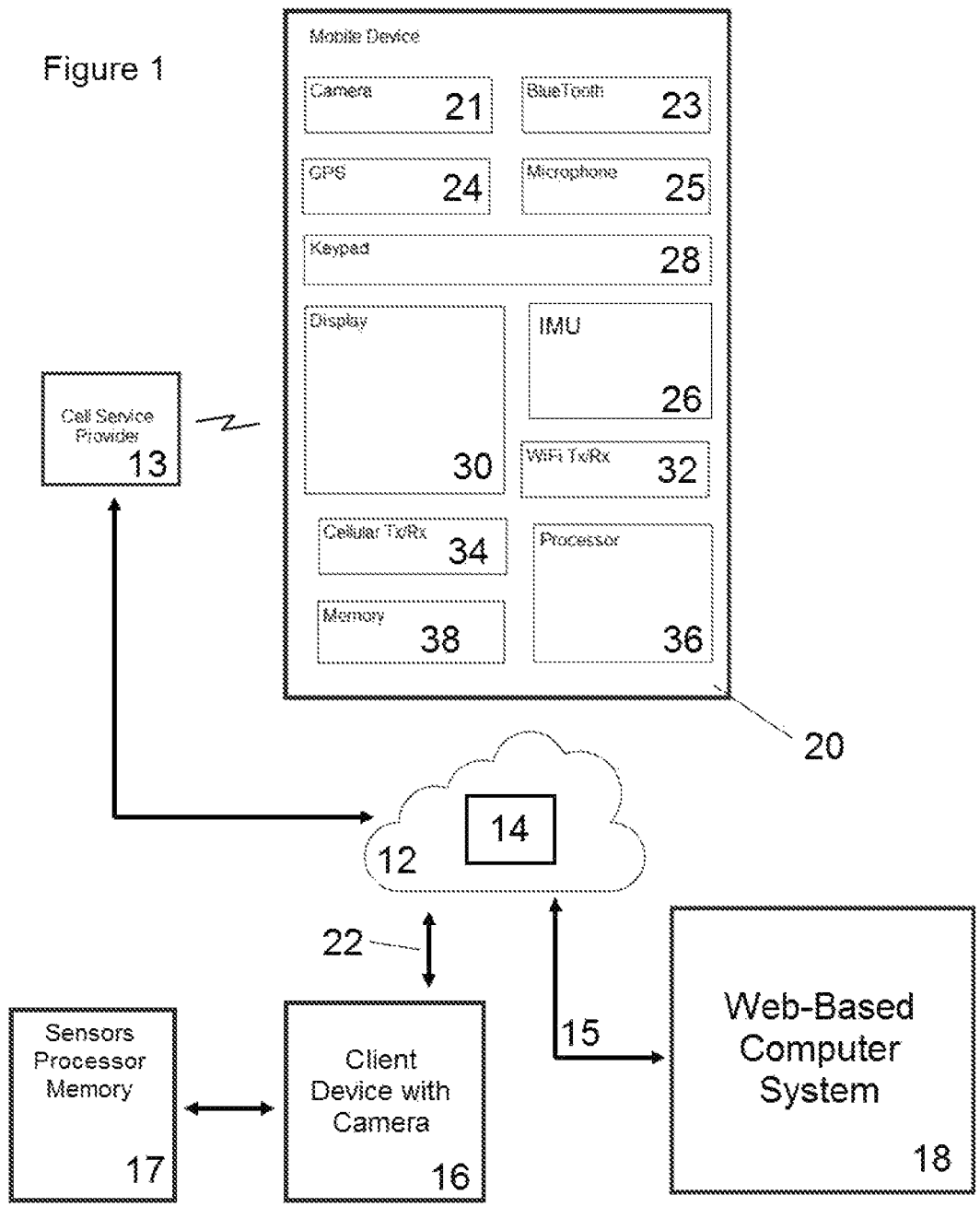
FIG. 1 is a schematic view of the video management system, according to one embodiment.

Referring to FIG. 1, according to one embodiment, an exemplary video management system 10 is shown for capturing, storing, accessing and presenting video files in any of a variety of situations, such as providing evidence in a court of law and showing relevant events of a car accident to an insurance company when filing a claim. System 10 includes a cloud-based system 12, having a cloud-based server 14, at least one client device 16, a web-based computer system 18, and a mobile device 20. Client device 16 preferably may include at least one video camera, a processor, memory, an accelerometer, a cellular communication module and a Bluetooth communication module and other electrical supporting components, collectively referred to as 17 in FIG. 1. Software programs are used to perform various features of the present invention, as described below, and run on various processors, depending on the software, located in cloud-based server 14, mobile device 20, web-based computer system 18, client device 16 and any other suitable electronic computer, mobile or otherwise.

Client device 16 is connected to cloud based server 14 via connection 22 which may be a cellular-based wireless packet data connection, such as a 3G, 4G, LTE, 5G, or similar connection.

Web-based computer system 18 can be any computing device capable of running a Web browser, such as for example, a Windows™ PC or tablet, Mac Computer, or the like. Web-based computer system 18 is connected to cloud-based server 14 over the World Wide Web using an Internet connection 15, such as DSL, cable modem, or the like, and may include a wireless local network connection, such as Wi-Fi connection, to an Internet-connected router.

In one embodiment, mobile device 20 may include a phone camera 21, a Bluetooth transceiver 23, a GPS module 24, an Inertial Measurement Unit (IMU) 26, a keypad 28, a display 30, a Wi-Fi transceiver 32, a cellular transceiver 34, a processor 36 and an internal memory 38. Mobile device 20 may be a smartphone, such as an Apple iPhone or a Samsung Galaxy phone, an Apple iPad, a tablet, or a laptop or any other portable electronic device that includes similar features and components and may connect to the cloud-based system 12 using wireless communications, such as a cellular-based wireless packet data connection using 3G, 4G, LTE, 5G, or similar a connection, collectively referred to as a Cell Service Provider 13. Display 30 may be a screen imaging device, or a touch display having keypad 28 implemented on the display itself.

Figure 2:
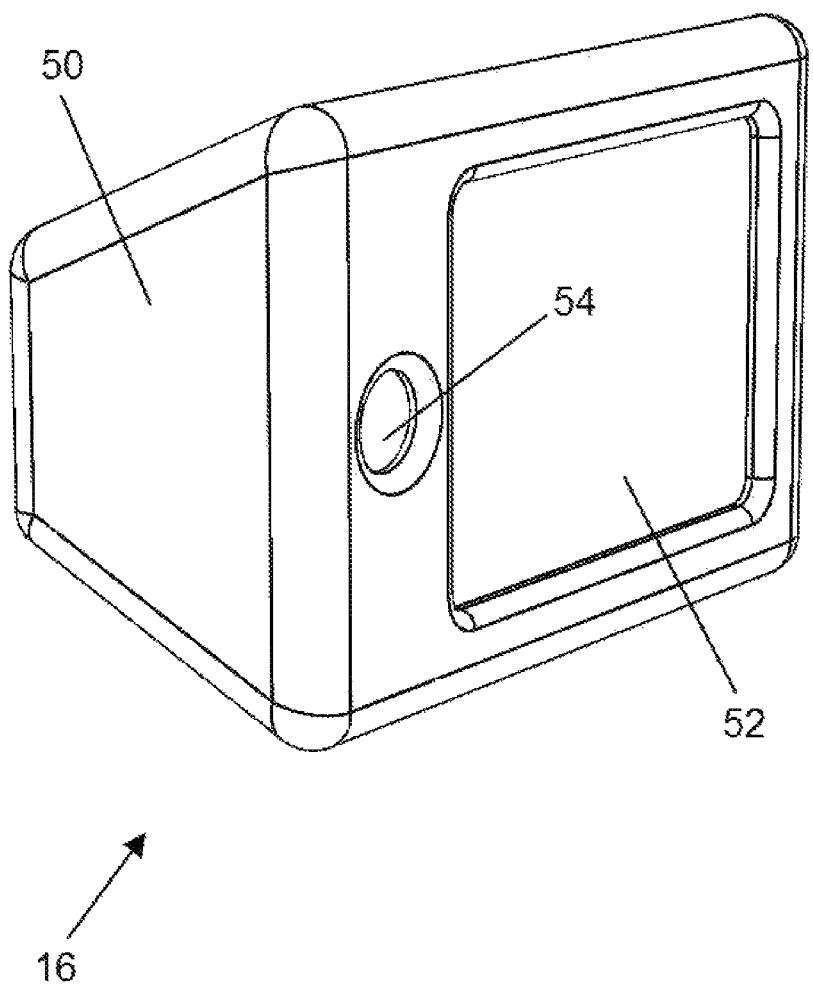
FIG. 2 is a front perspective view of an exemplary client device, showing a display and a cabin-view camera, according to one embodiment.
Figure 3:
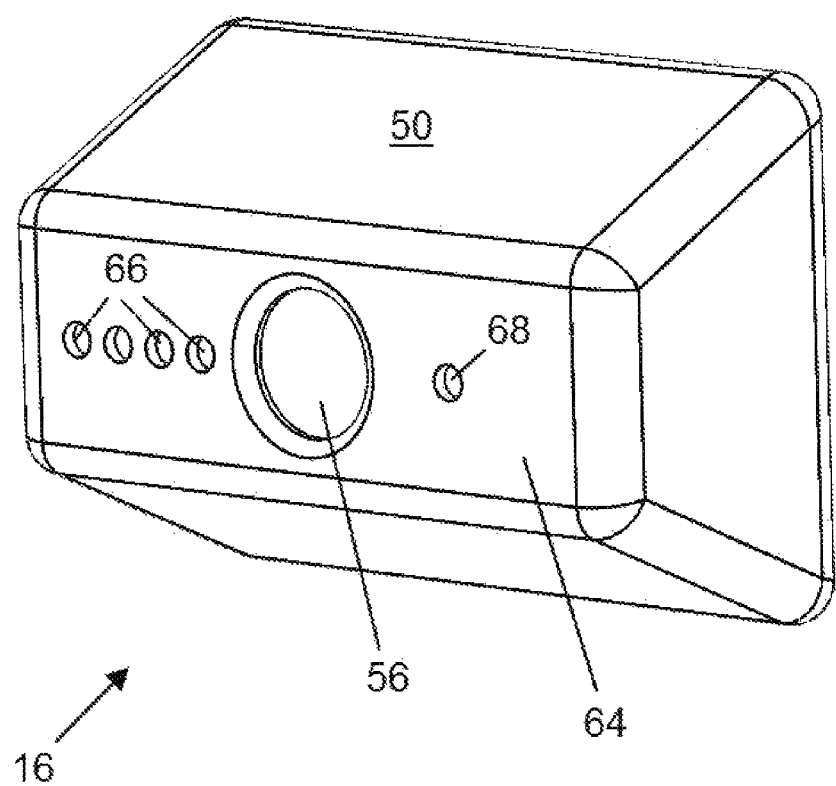
FIG. 3 is a rear perspective view of the exemplary client device of FIG. 2 showing a forward-facing camera and communication LEDs, according to one embodiment.

Referring to FIGS. 2 and 3, an exemplary client device 16 is shown according to one embodiment. Client device 16 may include a housing 50, a display 52, an "IN" or cabin-view camera 54 and an "OUT" or forward-view camera 56. Client device 16 may include multiple cameras covering different fields of view, such as side-facing cameras, rear-facing cameras, as well as a camera facing up. Also, different types of cameras may be used, including cameras with telephoto-type lenses, wide angle lenses, and 360 degree lenses. According to one embodiment, client device 16 includes a number of cameras to cover as much of the surrounding view as possible.

A shown in FIG. 3, in one embodiment, housing 50 includes a forward-facing surface 64 on which is mounted a group of communication LEDs 66 (only one is required, but several is preferred), and a photo sensor 68. As described in greater detail below, communication LEDs 66 may be used to communicate with other nearby client devices 16 mounted in other vehicles, by illuminating in a controlled flashing sequence. Photo sensor 68 is used to detect any incoming illumination transmission from communication LEDs 66 of another nearby client device 16.

Figure 4:
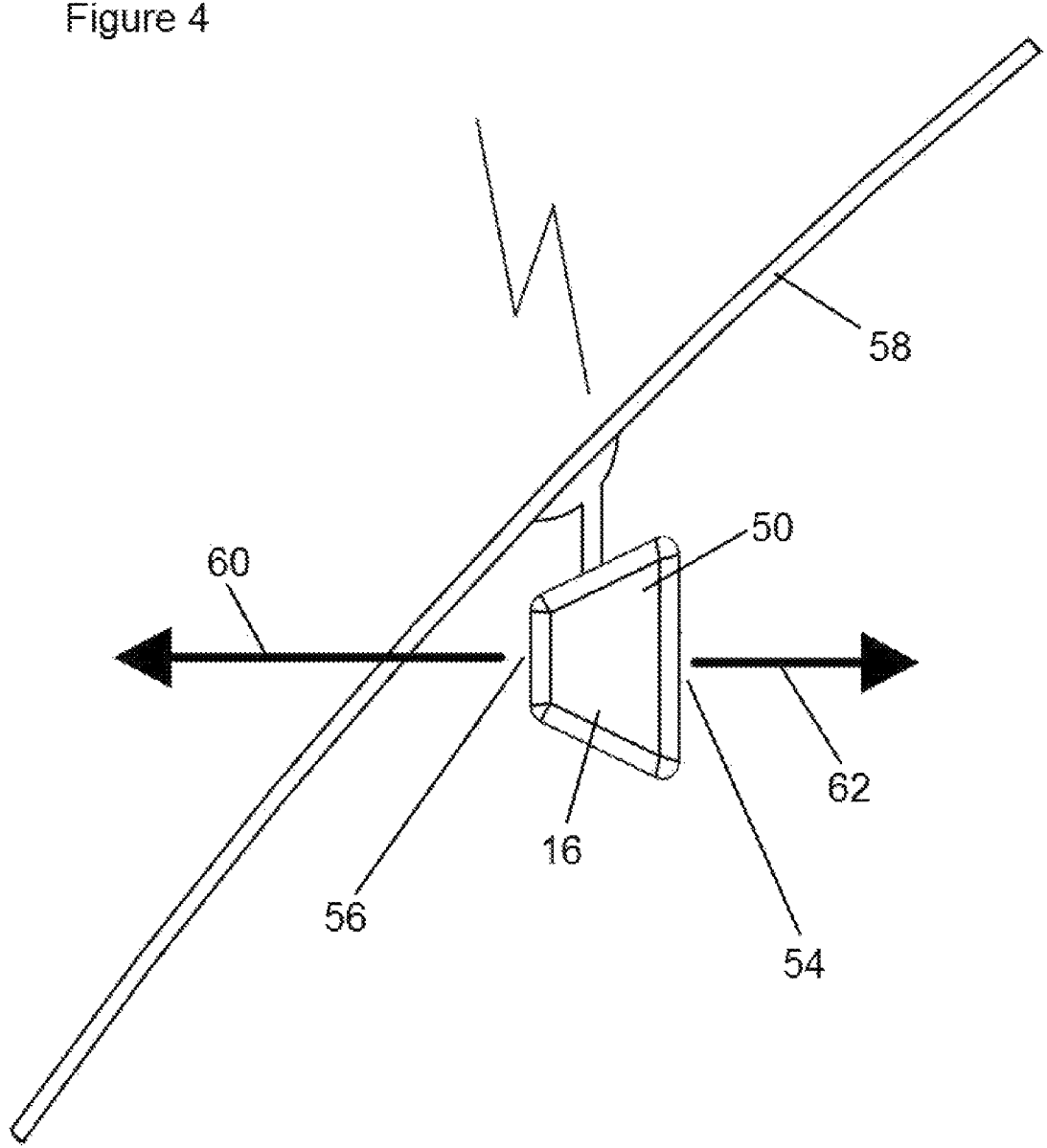
FIG. 4 is an illustrative side view of an automotive windshield environment, showing the client device of FIG. 2 mounted to a windshield, with arrows representing the direction of view the cameras, according to one embodiment.

Referring now to FIG. 4, client device 16 may be secured to the inside surface of a vehicle windshield 58, or alternatively may be mounted to other parts of a vehicle, like the dashboard or be secured or supported by multiple parts of the vehicle. Arrow 60, in FIG. 4, conveys the direction of view of forward-view camera 56, while arrow 62 conveys the direction of view of cabin-view camera 54. As mentioned above, client device 16 includes wireless communication with the cloud-based system 12.

With reference to FIGS. 2, 3, and 4, FIG. 5 illustrates an exemplary event according to one embodiment to illustrate one aspect of the disclosure, wherein a first vehicle 70 is shown in an accident, hitting a road sign 72. A first client device 16a recorded the events leading up to the accident and continues to record even after the impact. As described above, the video data recorded by both a cabin-view camera 54a of first client device 16a and a forward-view camera 56a is encrypted and stored in local memory, along with metadata collected from the sensors of client device 16a. When a connection is made to cloud-based server 14, video data or metadata may be transmitted to the cloud server 14 to be stored. Unfortunately, as described in greater detail below, the collected video data from client device 16a may not be sufficient to reveal what happened before, during and after the accident, or event. This is due to several factors such as a limited field of view of cameras 54a and 56a and a chance that client device 16a may have been dislodged or damaged upon impact with sign 72. In this instance, as described below, the driver of first vehicle 70 may send a request out to other nearby client devices, such as client device 16b. This second client device 16b is installed in a nearby second vehicle 74, which was just driving past when first vehicle 70 hit sign 72. There is a chance that forward-view camera 56b of client device 16b may have captured important information regarding the accident of first vehicle 70 and sign 72. Cabin-view camera 54b records the driver of the second vehicle 74. This information may be used to help identify witnesses to the accident, as described below.

According to another embodiment, and as further described in the related parent application, since the cloud-based server 14 periodically receives metadata from all client devices 16, which may include GPS coordinate data, it can determine the location of each client device 16 so that second client device 16b is automatically identified as being nearby client device 16a at the time and date that car with client device 16a crashed. In response to this, server 14 automatically instructs nearby client device 16b to transmit relevant video data to server 14 to be stored for later use. It is contemplated that the received video data may be automatically erased in a predetermined amount of time, such as 10 days, unless the video data is requested by another client device owner, such as the one involved in the recent crash (i.e., client device 16a). Alternatively, nearby client devices 16a and 16b may communicate with each other using Bluetooth, Wi-Fi communication modules, or using LEDs, as described in greater detail below.

According to one embodiment, when client device 16 records a video segment, the video data, along with various metadata is stored locally using suitable electronic memory component, such as flash-type memory. The processor in client device 16 uses an encryption algorithm to encrypt the video data and the metadata. The processor further performs a hash conversion using any suitable hashing process to convert a predetermined length (a segment) of recorded video data and the associated metadata creating a message digest. The processor performs the hashing for each segment of video data (which can be any length, but is preferably about 2 seconds long). The processor may further generate a digital signature by further encrypting each message digest for each segment of video data. The resulting secured and verified data may be then transmitted to cloud-based server 14 for secure storage or stored locally on client device sending only the cryptographically signed metadata for each message digest to cloud-based server 14 for storage.

According to another embodiment, nearby client devices may communicate with each other without using server 14. Referring back to FIG. 5, for example, in this embodiment, accelerometer sensors located in client device 16a are used to detect that a crash has just occurred and in response, client device 16a transmits a wireless Bluetooth signal (a "distress" signal) to any client device in the area (depending on the range of the Bluetooth signal). Alternatively, client device 16a may use LEDs 66 located in a front section of housing 50 to transmit a signal to any client device in range. The LEDs may be the type which illuminate in the visible spectrum, or in the Infrared (IR) spectrum.

Regardless, the processor located with client device 16a can be used to flash or blink LEDs 66 on and off to transmit a prescribed sequence so that a signal is effectively sent to nearby client devices.

Regardless how the "distress" signal is transmitted, the signal itself includes a unique code which identifies the client device 16a (the car that just crashed). Any nearby client device may receive the transmitted signal, either using optical sensors 68 to detect and receive the flashing illumination signal from LEDs 66 of client device 16a, or includes a Bluetooth module which receives the Bluetooth signal.

Figure 5:
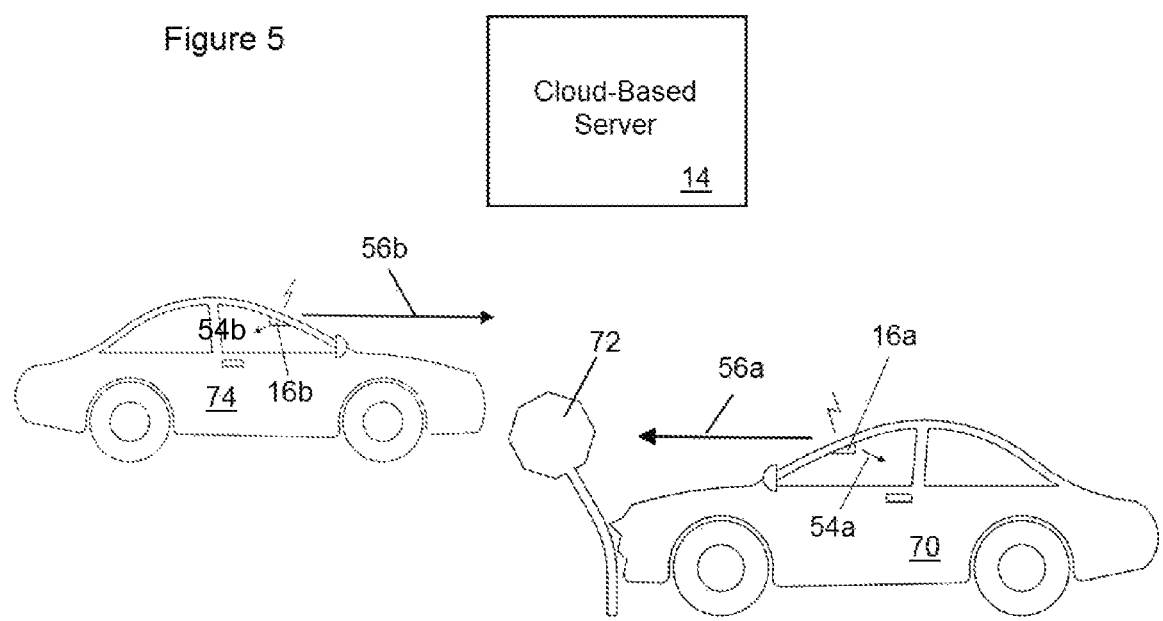
FIG. 5 is an illustrative side view of an exemplary accident scene, showing a first automobile involved in an accident and a second automobile driving nearby, according to one embodiment.

Once the distress signal is received by any nearby client device, such as client device 16b in FIG. 5, the processor in the nearby client device 16b instructs recent video footage (of a predetermined duration before and after the time when the distress signal is received, such as 2 minutes before and 2 minutes after) to be saved and locked in the local memory component of the nearby client device 16b. When a connection is made between client device 16b and cloud-based server 14, the processor of the client device 16b transmits the stored video data associated with the accident or event, including the identification code of the client device 16a. Server 14 stores the relevant video data for a prescribed length of time. According to another embodiment, server 14 automatically sends a notification to the owner of client device 16a, via email, text or a message to be displayed on client device 16a itself, stating that relevant video data has been received and stored regarding the event that involved client device 16a on a specific day, at a specific time and location. Server 14 includes location information regarding the location where the crash took place and where the nearby client device 16b was located. While the above example involved a crash, the same approach would be effective in other types of events, including break-ins, thefts, and other types of damage or actions that may be captured from different client devices.

According to an embodiment, a user may use his or her mobile device 20 to selectively access and manage video files (and other types of files) stored either locally, in memory 38, or at remote server.

Figure 6:
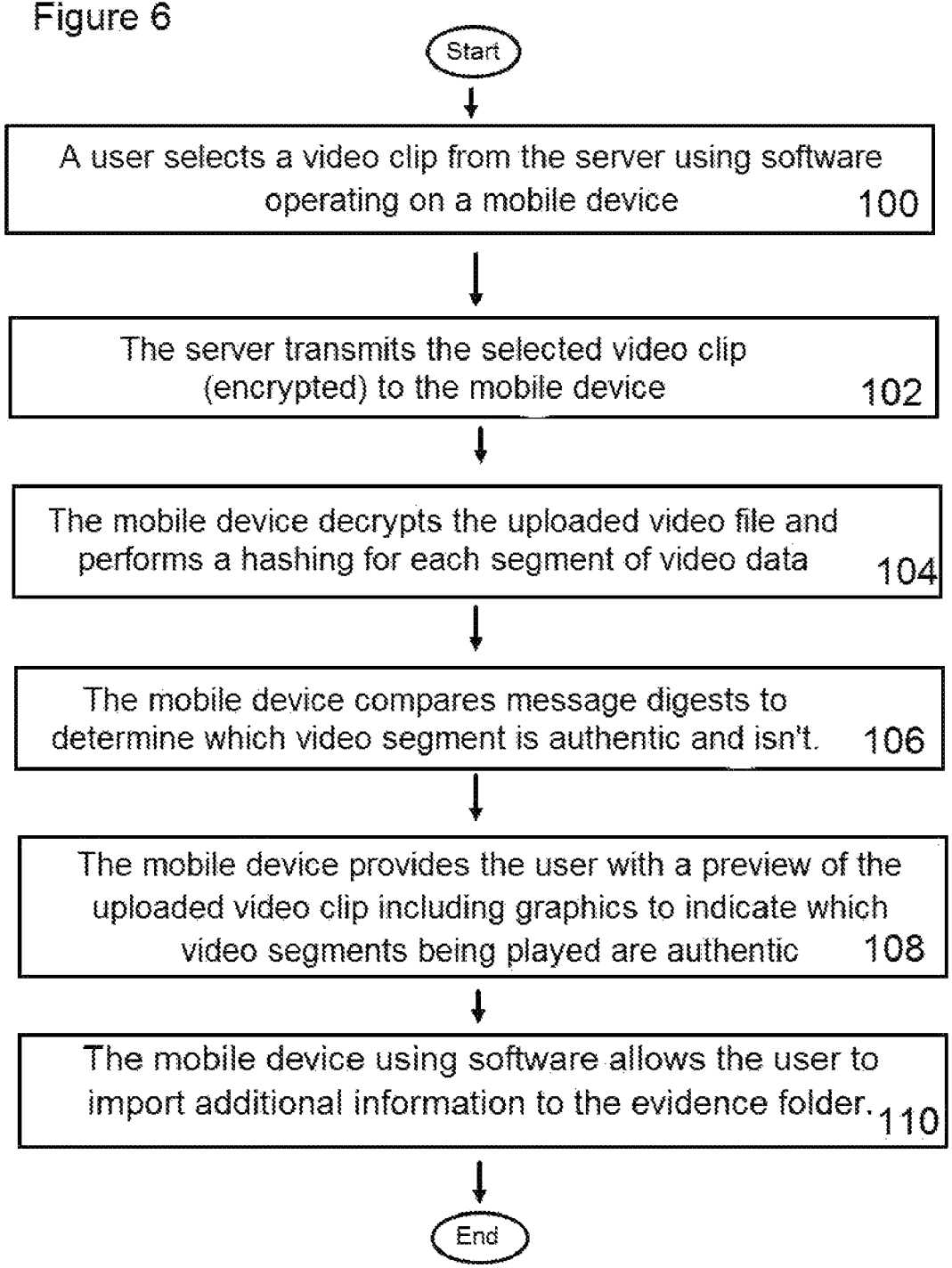
FIG. 6 is a block diagram showing a method to create an electronic "evidence package", including at least one video clip, according to one embodiment.

Referring to FIG. 6, a flow diagram shows the steps for a method for creating an evidence folder or package, according to one embodiment. In step 100, a user selects a video clip from the cloud-based server 14 or a local device (such as a mobile device or other type of computer), using software operating on mobile device 20. In step 102, the cloud-based server 14 transmits the selected video clip to mobile device 20. The video data includes metadata and a message digest (hash code) for each segment of video transmitted. The metadata and digest were generated when the video data was originally captured by a client device and sent to cloud-based server as described above. In step 104, mobile device 20 uses software and a private key to automatically decrypt the video clip and then further perform a hashing for each segment of the decrypted video data, using the provided metadata to create its own version of the message digest for each video segment. In step 106, mobile device 20 uses software to automatically compare the newly created message digest with the digest server 14 originally sent to determine which video segments are authentic and which segments are not. If the video data or metadata have been modified form the time originally captured and set to cloud-system 12, the hashed of the modified video data or metadata will not match the original, authentic, hash. Mobile device 20 uses software to keep track of this information so that in step 108 a preview of the video clip may be watched on display 30 of the user's mobile device 20. According to one embodiment, "authentication graphics" may be presented on display 30 for each segment of video being played to convey if the segment being shown is authentic or not authentic. In one embodiment, once a segment of a video recording is found to not be authentic, the graphic indication changes to note the change. This allows the user to quickly perceive the result of the authenticity check, determining which parts of the video being watched may have been modified.

According to one embodiment, the action of uploading any video file to mobile device 20 initiates an automatic authenticity check against the hash codes provided.

Figure 8A:
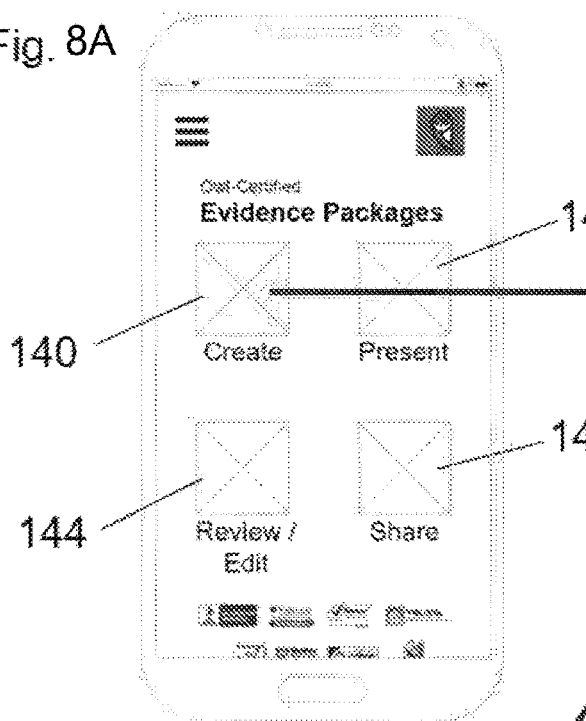
FIGS. 8a-8n are illustrative screen views of an exemplary mobile device, showing a select pages of a software application program for creating an evidence package, according to one embodiment.
Figure 8B:
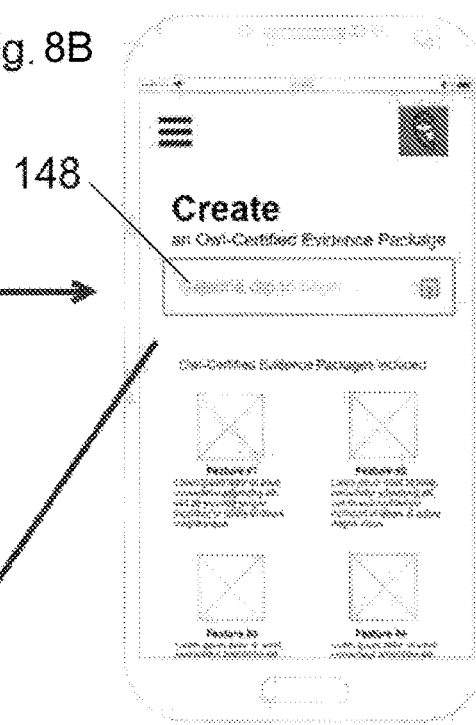
Figure 8C:
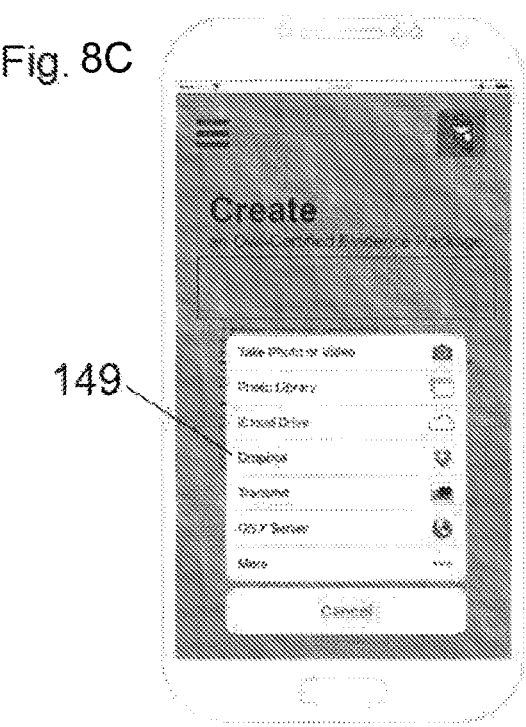
Figure 8D:
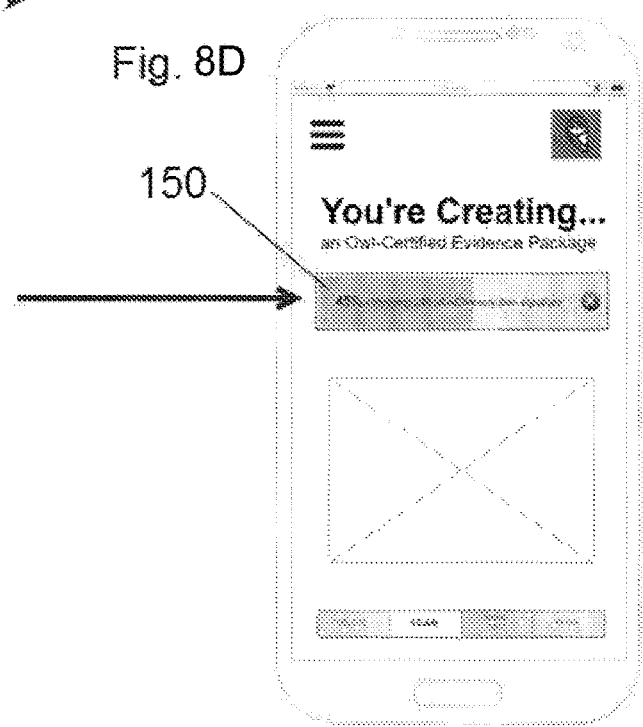
Figure 8E:
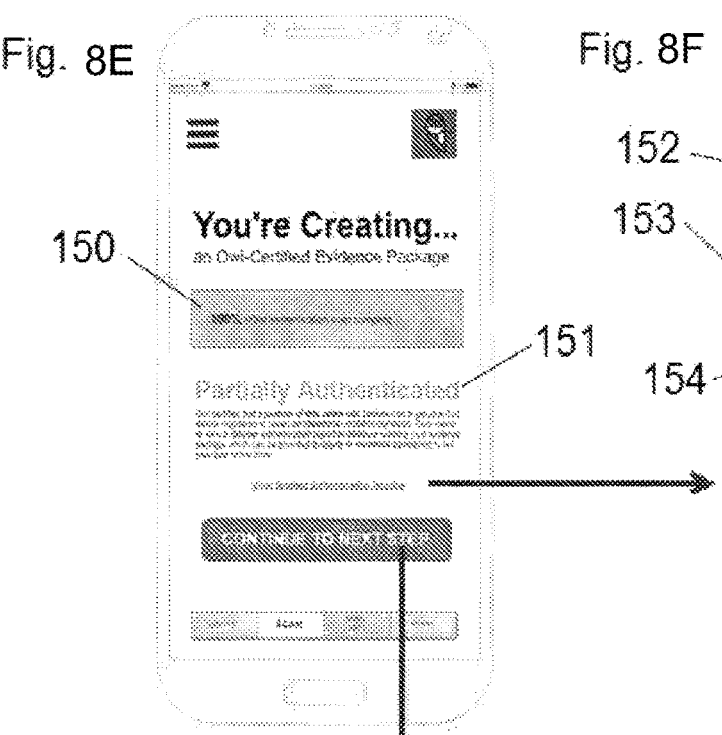
Figure 8F:
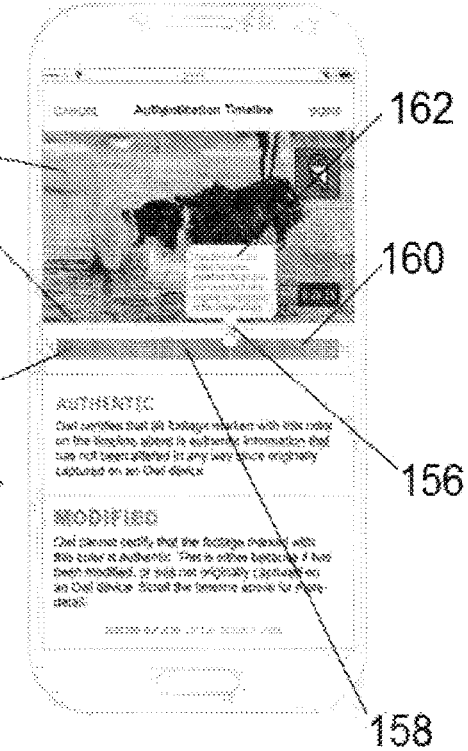

According to another embodiment, as for example illustrated in FIG. 8f, the "authentication graphics" may be in the form of a colored timeline positioned under or near the window showing the video on display 30, wherein different colors along the timeline represent different authentication status—e.g., green means authentic, while orange or red color means that those corresponding video segments are not authentic and appear to have been altered or modified. Other contemplated types of authentication graphics include the use of icons shown as an overlay onto the video being played and being of varying color, size and shape, as well as the introduction of sound, such as generating a tone whenever a non-authentic segment (e.g., a single or a few video frames) is being shown on display 30.

According to an alternative method (not shown), step 108 may be replaced with a step wherein software automatically removes or redacts those segments which fail the authenticity check so that only authentic video segments are uploaded to mobile device 20.

In step 110, mobile device 20 uses software to allow the user to import additional information to the evidence folder, which may include additional video data, documents, photos, or other data.

After an evidence package is created, a user may wish to present the package to others, such as an insurance agent or may want to use the evidence package in a court proceeding or the like. According to one embodiment, the user may follow the method steps shown in FIG. 7, to share the evidence package, wherein at step 112, the user selects an evidence package having a video clip and using software on a mobile device 20. In step 114, information is displayed by the software regarding details on the video-authentication process, such as: "every 2 seconds of video is 'hashed' using select metadata to create a unique message digest or hash code." In step 116, the software running on mobile device 20, provides the user (or others) with a preview of the video clip in the evidence package, including displaying a map of the area showing the dynamic location of client device 16 when the video clip was being recorded. In step 118, the software running on mobile device 20 displays a certification verifying the time, date and location of the video content was recorded. In step 120, the software displays the identification of drivers using nearby client devices 16, when the video clip was being recorded.

According to another embodiment of the invention, mobile device 20 further includes a step (not shown) which may be performed after step 118 of FIG. 7, wherein coaching advice is provided for the user to help him or her persuade others that the video shown in the evidence folder is authentic. The coaching advice may include suggested language to recite to the viewer along with access to case histories of similar events, and the use of "authentication graphics" with the playing of the video, which is described above and in reference to FIG. 6, and any other information which would assist the user in defending his or her position stemming from the accident, or event. This feature is particularly helpful when the user does not have an attorney present to help, such as when the user is in a traffic court fighting a traffic ticket.

Referring now to FIGS. 8a-8m, illustrative screen views of example of a software program following the method steps of FIG. 6, described above, to create an evidence package is shown, as it would appear on display 30 of mobile device 20, in accordance with one embodiment. According to the preferred features of the software application, there are four categories of which a user may select by touching any of the graphic touch-screen buttons: a "Create" button 140, a "Present" button 142, a "Review and Edit" button 144, and a "Share" button 146.

By way of example and explanation, to start, the user begins the process to create an "evidence package." According to one embodiment, an evidence package is a single memory folder which includes all relevant electronic evidence, including reference materials useful in clarifying the factual reality of a particular event. The evidence may include a video clip or clips, pictures, documents, such as police reports, damage assessments, affidavits, and lists of witnesses. To begin this process, the user touches button 140 on display 30 of their mobile device, as shown in FIG. 8a. This action will open a "Create" page, as shown in FIG. 8b. This page will include a section 148 for the user to input a file name of a video clip that he or she wants to include in the evidence package and will provide instant access to a list of file sources 149, in FIG. 8c, such as "Photo Library", "iCloud", and "Dropbox". The user will use this directory in a conventional manner to locate and select their desired video clip so that the video clip will begin to upload to the local software application on mobile device 20, as illustrated in FIG. 8d as an uploading graphic 150. According to an embodiment of the invention, during this time, the selected video clip, including its associated metadata and message digest (one for each predetermined segment of video, such as every 2 seconds), are locally decrypted using an appropriate decryption technique, such as GPG. Then, local software is used to individually hash every predetermined segment of the video to generate a "new" message digest for each video segment. The new message digest for each segment is then compared with the original message digest for that segment, to authenticate each segment of video. According to another feature, a preview of the selected video clip will automatically play on display 30 as the file uploads to mobile device 20.

Continuing with this example, the selected video file is shown fully uploaded in FIG. 8e, as indicated by a visual indication of success which could include a complete uploading graphic 150 and a numerical value of 100%. According to one embodiment, the page illustrated in FIG. 8e further includes an overall assessment 151 regarding the authenticity test results for the uploaded video clip. In this example, the assessment is shown to be "Partially Authenticated", but the assessment may also be "Fully Authentic" or "Not Authentic". From a link provided on the page illustrated in FIG. 8e allows the user to open another page, shown in FIG. 8f, which provides a preview window 152 for allowing the uploaded clip to be selectively played by the user and, preferably positioned immediately adjacent to a lower edge 153 of preview window 152, an authentication status graphic timeline 154 (in the form of a video-playing timeline), including a current-view indicator 156.

According to a feature of one embodiment of the invention, the authentication status graphic timeline 154 conveys to the user (or viewer) which portions (e.g., 2 second segments) of the video clip being previewed were tested as authentic and which portions appear to have been modified.

As the authenticated video clip is previewed within preview window 152, current-view indicator 156 will move along the authentication status graphic timeline 154 corresponding to the frame of video in view in the display, and indicate if the frame being viewed is authentic or modified. In the example shown in FIG. 8f, orange colored sections 158 positioned along authentication status graphic timeline 154 represents that the corresponding video has been modified, or completely masked out. Similarly, sections 160 of authentication status graphic timeline 154 colored blue represents that the corresponding video has been tested authentic. In the example shown in FIG. 8f, current-view indicator 156 is located within orange section 158 and therefore the particular image being displayed has been tested as being modified. If the user touches current-view indicator 156, or some other prescribed area on the page of FIG. 8f, an explanation 162 of why the particular video image being previewed was tested as modified (i.e., detail of the authentication test results). In this example, the particular image being displayed failed authentication because a portion highlighted within the image for that particular video segment did not match the original.

Figure 8G:
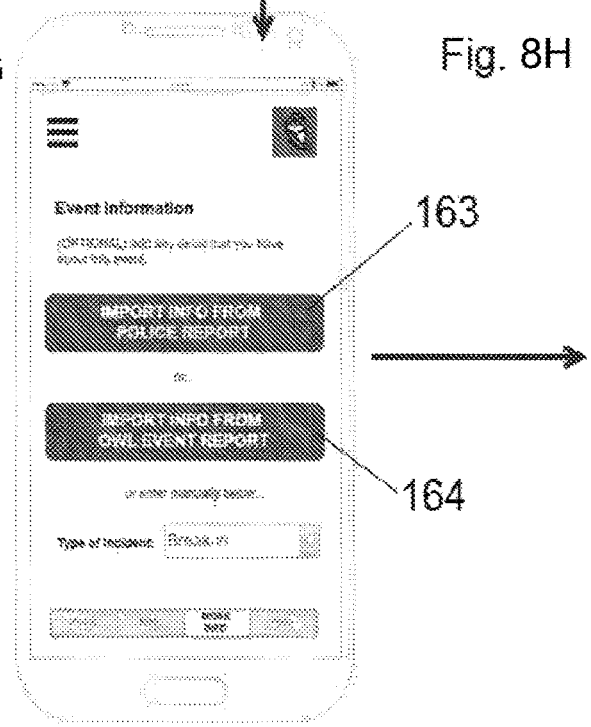
Figure 8H:
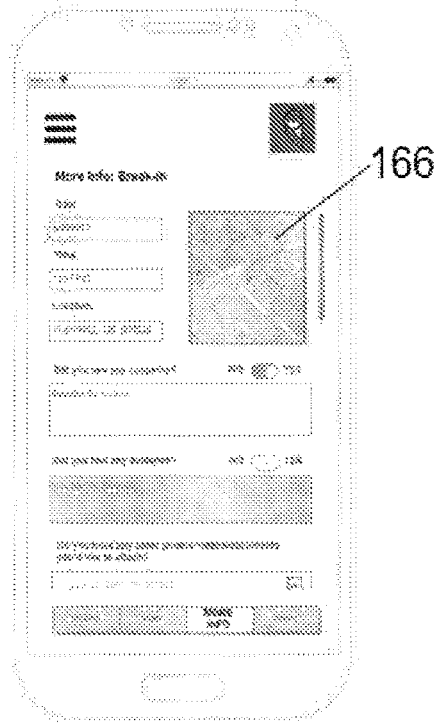

When the user is done previewing the image, shown in FIG. 8f, the user can return to the page shown in FIG. 8e and press "Continue to Next Step," which will cause the page shown in FIG. 8g to open. Here, in this example, the user may identify the type of incident, such as a break-in, an accident, damage to the user's car, etc. The user may import information from a police report by pressing button 163 labeled: "Import Info From Police Report", or import information generated from an "Event Report", by pressing button 164 labeled: "Import Info From Event Report". According to the invention, an Event Report, as shown in FIG. 8*h*, allows the user to be coached by the system to provide additional relevant information regarding the particular event, such as describing or listing any suspects or material evidence, and providing time, date and location (a map 166 is preferably provided, as shown in FIG. 8*h*). For example, the software may offer audible or text suggestions, such as, "It is important to get a list of names of everyone nearby with their telephone numbers—these people may be helpful later on as witnesses to the accident." The Event Report also allows a user to upload other photographs, video and documents.

Figure 8I:
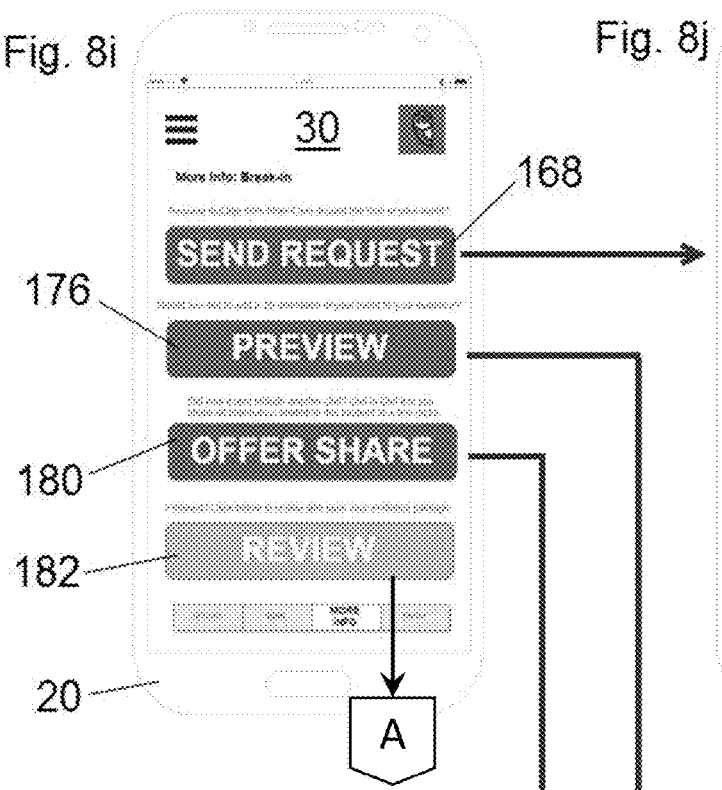

Continuing with the detailed illustrative method to create an evidence package, according to the present invention, and referring to FIG. 8*i*, a page opens to allow the user to ask other people using a client device to share relevant footage, by selecting a "Send Request" button 168 on display 30. This action opens another page, shown in FIG. 8*j*, which allows the user to send a request to other people in the client device network who were in the area of the event at the date and time of the event to see if they may have captured relevant video footage. Different methodologies for sharing event-based video data are further described in the parent application, PCT/US17/50991. The user is provided with fields (pre-populated with event metadata) including date, time and location of the event, as well as a prompt 170 to write a message explaining what footage is needed and why it would be helpful. A graphic map 172 is provided which will display icons which represent any client device users that were in the area at the inputted location, date and time. The user may touch specific user icons appearing on the map to select which client device users the share request is to be sent. The user presses a Send button 174 to send the requests to the selected client device users.

Figure 8J:
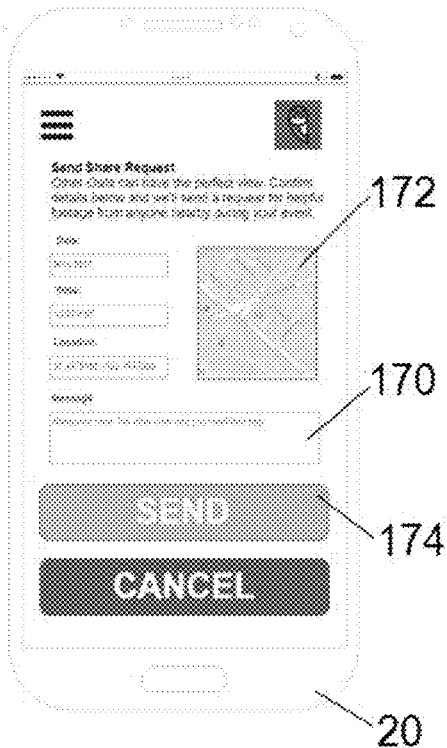
Figure 8K:
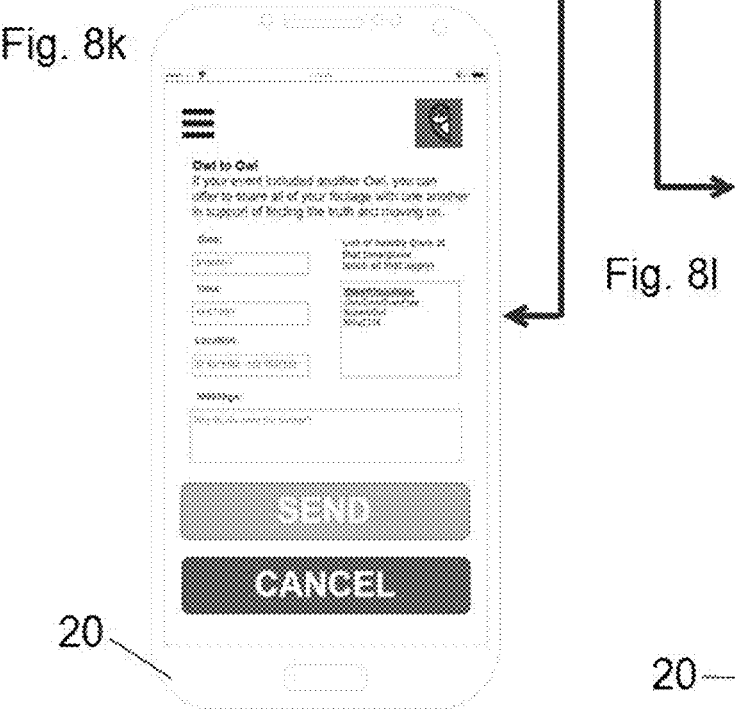
Figure 8L:
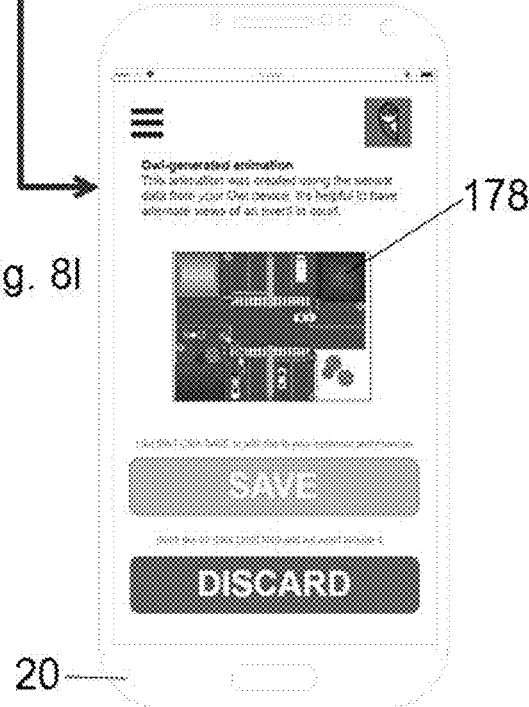

According to another feature of one embodiment, a preview button 176, labeled "Preview" allows the user to view and retain a 2-D and 3-D graphic animation 178 of the incident or event, as shown in FIG. 8*j*. According to the invention, the software application will automatically generate objects in either 2-D space or 3-D space based on objects the processor and the software application are able to recognize in the selected video clip and known positioning of roads, structures and traffic signs as provided by common libraries (e.g., Google Maps API) and the relative positioning of those objects in 2-D or 3-D space. For example, a stop sign may be identified and recognized as a stop sign within a video clip. The location and orientation of that stop sign within the field of view of client device 16, as it was recorded and appears on the selected video clip can be calculated using conventional techniques understood by those skilled in the art and recreated within animation 178. Streets, trees and buildings, as well as people that appear and are recognized in the video clip may be recreated as a simple block animation (with limited detail) and populated within a simple 2-D or 3-D animation or recreation of the event or incident. Movement (direction, speed, and acceleration or deceleration) of each object appearing in each scene may be calculated from the video clip by using the metadata provided with the video clip file, including GPS data, accelerometer data, compass heading, time, date and other sensor output. This sensor information is accessible by the processor and the software application to help recreate the movements of the different objects located within the field of view, as recorded on the selected video clip. The recreated objects within animation 178 can include labels (not shown) which identify the recreated objects, such as "tree" and "stop sign", etc.

Referring back to FIG. 8*i*, an "Offer Share" button 180 is provided to allow the user to share information that he or she has with other client device users. For example, if one client device user captured footage of a car accident, he or she can capture the relevant video footage and offer to share the footage by pressing the "Offer Share" button 180, which would cause a share page (FIG. 8*k*) to open wherein the user would enter the date, time and location of the event (or this information would automatically populate) and includes a message. The information would be stored at secure server 14 so that it would be available to another client device user who later requested any video clips taken near the same location, at the same date and time. Additionally, a list of nearby drivers using other client devices 16 may be listed, as they would have been automatically recognized by the system during the event with their identification information being part of the metadata stored on the video clip file.

Referring back to the mobile device screen view shown in FIG. 8*i*, a "Review" button 182 is provided to allow the user to review the contents of the now assembled Evidence Package. Pressing this button causes a page to open, as shown in FIG. 8*m*. This page will provide the user with a file list of package contents (not shown) of the evidence package and an opportunity to preview each file. A suggested unique filename 183 is automatically provided for the evidence package the user just created. The user may change the name if desired. The user may save the evidence package file by pressing the "Save Package" button 184 offered on this page, FIG. 8*m*, which will open another screen page, FIG. 8*n* which confirms that the evidence package has been successfully saved in secure server 14. From this screen page (FIG. 8*m*), the user may present the evidence package, by pressing the "Present" button 186, download the file to a local device, by pressing the "Download" button 188, and share the file through 3rd party apps such as social media, by pressing the "Share" button 190. According to one embodiment of the invention, the software running on the user's mobile device 20 will automatically encrypt and hash the entire evidence package before uploading it to secure server 14 for storage.

Once an evidence package has been created, as described above, and safely stored in the secure server, a user may then decide to present the package. Depending on the situation, the user may show the evidence to an insurance company or agent, an attorney, a judge or a policeman. To begin this process, referring to FIG. 9*a*, the user presses graphic button 142 on display 30 of their mobile device. This action will open an "Introduction to Present" screen page, as shown in FIG. 9*b*. According to this embodiment, this screen page will provide facts to the user and the viewer regarding the integrity of the method of encryption, hashing and authentication used by the software application in conjunction with the client device used to capture the initial video clip and later verify that the video clip being presented is indeed, authentic. This information (along with the above-described user-coaching regarding the capabilities and competence of the present evidence system) can be used by the user to help persuade the viewer to accept as or ensure that the video clips in the evidence package are authentic (where noted authentic—see FIG. 9*f*). The user may advance to another screen page, shown in FIG. 9*c*, where the selected video clip of the evidence package is played in window 192 of FIG. 9*c*. Since client device 16 includes a forward-facing camera 54 and a rearward facing camera 56, the user may "toggle" between the video footage from either camera by pressing a graphic button or by simply swiping display 30 up or down, left or right, so the viewer can quickly view what the driver of the car would see at that time (forward camera) and then view the inside of the car to confirm the identification of the driver and passengers and other relevant information. In an alternative embodiment, the presentation may be done by an expert witness (the user above) who can testify about the operation of the software and the details about the collection and generation of the evidence package and how the authentication test determines whether the video data may have been modified in any way.

According to one embodiment, a dynamic map view 194 is preferably included on this page (FIG. 9b), adjacent to window 192 that shows the location of the vehicle synchronized to the video being played in window 192 so that the viewer will know the location and direction of travel of the car for each frame of video being displayed. Dynamic map view 194 may appear adjacent to preview window 192, as shown in FIG. 9c, or alternatively, map view 194 and preview window 192 may both be toggled from one to another to appear as a full screen. In such instance, the user may benefit from viewing a larger image. Also, when map view is toggled to appear, the playing of the video preferably pauses until the user toggles back to view the video, at which point the video will automatically resume where it left off.

According to one embodiment, the screen page shown in FIG. 9c further includes a statement certifying the authenticity of the video clip and that the video was recorded on a particular date, time, and location, and that the driver is an identified or unknown person whose image may have been recorded by cabin-view camera 54 of client device 16.

According to one embodiment, another screen page, shown in FIG. 9d is provided to show information regarding other client device users in the area of the incident. This information may be available from location metadata from client devices 16 sent to cloud-based server 14. Based on this, server 14 may instruct each client device in the area of an accident or an event at the same date and time to capture video before, during, and after the subject event occurred to preserve potential evidence. The recorded footage and associated metadata from each instructed client device 16 is transmitted to server 14, either immediately or as soon as possible for storage and later retrieval, when requested. The information of nearby client device users is already stored in server 14 as user-profiles during initial setup and may include names, member numbers, and even live images of the drivers of those nearby cars, as taken by cabin-view camera 54, or representative profile pictures. The user may select any of the nearby client device users listed by double-touching the screen over one of the images. This will open a new page, shown as FIG. 9e which shows a preview on display 30 of the video footage shown by forward-looking camera 54 of the client device 16 of that particular and selected user. A smaller window 196 may be provided as a "picture-in-picture" view of the cabin-looking camera 54 of the selected nearby client device user.

According to another embodiment, all major components used in each client device 16 periodically undergo diagnostic testing following a prescribed testing protocol. This component or system-level diagnostic test is automatically performed after an event and the results are stored in server 14 for both before and after an event (the results from the most recent test performed the before the event or accident would be used for the "before test"). This information is automatically provided in the evidence package to show the operational condition of each major component of client device 16.

After the preview is complete (or whenever the user wishes), the software running on mobile device 20 opens another screen page, shown in FIG. 9f, wherein a summary of component diagnostic testing both before and after an event is shown, preferably graphically, such as using colors—green representing "good working order", or "PASS", as shown in table 198 of FIG. 9f, and red representing that the particular component failed testing and the tested parameters of component are considered to be residing beyond an acceptable range ("out of spec").

The screen page shown in FIG. 9g is a page directing the user to a webpage link for finding additional information regarding the encrypting, hashing, and authentication process.

The screen page shown in FIG. 9h is a page that provides additional resources and actions which may assist the user in resolving issues stemming from the accident or event. The user simply presses one of the graphic buttons 200 to access the listed resource, which include: "Replay Video", "Activity/Data Log", "Maintenance Log", Client Evidence", "Defense Resources", "F.A.Q.", "Case Histories", "Additional Files."

The software of the present invention running on a user's mobile device 20 used to generate the above described evidence package provides the user to review and edit any evidence package already created and stored either locally or in secure server 14. According to one embodiment of the invention, after the user presses button 144 of screen page shown in FIG. 10a, labelled "Review/Edit", a new screen page, shown in FIG. 10b, opens showing a list 202 of stored files. The list format may be convention, but according to the invention, each file is authenticated in real time, when the file list first opens so that the user can immediately and visually understand which of the listed files is authentic (shown in green color 204) and which files are not (shown in red 206), in FIG. 10b.

According to one embodiment of the invention, a share feature is shown, as button 146 in FIG. 8a, labeled "Share", wherein a user may share a stored evidence package, or any video file or document file located within an existing evidence package or otherwise stored either locally or on secure server 14, with another person, agency, or social media site, etc. Preferably, on this screen page, the user is informed that video data and other electronic information is not verifiable unless client software is used and the computer device may be connected directly to the secure server 14. According to one embodiment, a share includes a watermark embedded on all contents of the evidence package and also includes a hyperlink which returns a user to a secure presentation tool on a website, from which the data may now be presented with full certainty and confirmation that the video and other data is indeed authentic.

According to one embodiment, and referring to FIG. 11, a method for automatically providing authentication to an uploaded video file is shown. The authentication method begins at a first step 250, wherein a video file is uploaded to cloud-based server 14. The video file includes metadata, including a message digest (hash code) and, if present, a client device serial number. The client serial number is provided by client devices 16 when a video is recorded using client devices 16. The uploaded video file will only have a client serial number if that video file was recorded using a client device 16. In step 252, software located at and running on cloud-based server 14 is used to automatically search the uploaded video file for any recognizable serial number, which would indicate that the video file was originally created on a client device 16. If a client serial number is found, the software will use the serial number to automatically locate a video hash message digest stored in server 14, which is associated with the uploaded file. In a third step, 254, if server 14 is able to locate a stored video hash message digest which corresponds to a hash code for each predetermined segment of the original version of the uploaded video, then the software will automatically generate a new hash message digest for each predetermined segment of the uploaded video data using the included metadata. In step 256, the software running in server 14 will automatically compare for each segment of video, the new hash message digest with the stored original hash message digest, and finally, the software will display the comparison results to reveal the authentication status of each predetermined segment of uploaded video data.

As would be understood by persons of ordinary skill in the art, the software performing the method of FIG. 11 and described above can run on any computer, including server 14, a web-based PC 18, or a mobile device 20.

If the software is unable to locate a client serial number in the first step 250, then the software will notify the user that the uploaded video file is not authentic since no client serial number was found during the review. If the serial number is located in step 252, but the software running on server 14 is unable to locate a matching original video file using the serial number of the uploaded video file, then the user will be notified that the uploaded video file cannot be authenticated. Alternatively, if server 14 finds a matching metadata file and hash or digest form the original transmission from the client device identified by the serial number, the server may use the pre-existing hash for the authentication test, without requiring the original video data itself.

If in step 256, the new hash message digest fails to match the original hash message digest of any particular matching segment, the user will be notified, regarding the failed segments.

Finally, the user will receive the authentication comparison results of each video segment of the uploaded video.

This method would be very useful for anyone who would like to quickly and easily confirm the authentication of any video file, such as an insurance company trying to resolve a claim, an expert witness who may be testifying regarding the video at trial, or the like. The "user" does not have to be the owner of the video clip or even own or use a client device. According to this invention, any person with any video clip can use this method to independently verify the authenticity of the video clip.

According to another embodiment, system software running on client device 16 uses cabin-view camera 54 to automatically record the driver of a vehicle in response to detection of an accident or event, as determined by accelerometer sensors located within client device. The system software then performs facial recognition on the captured video footage of the driver of the vehicle before, during and after a detected accident or event to confirm the identity of the driver during the critical moments leading up to, during, and after the accident or event. To further confirm the identity of the driver in a vehicle, client device uses a Bluetooth module or other wireless communication systems to detect electronic smart devices known to be owned and used by the authorized driver of the vehicle as further described in the parent application incorporated above.

According to another embodiment of the invention, the present system may use the GPS module (or BLE beacon technology, or Wi-Fi) to detect nearby client devices surrounding an accident or event and collect video data, including metadata associated with the video clips. Software running on server 14 or client device 16 may analyze the collected video data of the various client devices, each presenting a view of the vehicle accident from different vantage points and use the information to generate a composite view of the accident scene, hopefully filling in portions of the scene so that a greater amount of information regarding the accident or event may be presented.

The foregoing description of the embodiments has been presented for illustration only; it is not intended to be exhaustive or to limit the patent rights to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

The invention claimed is:

1. A computer system comprising:
    a processor; and
    memory storing processor-executable instructions that, when executed by the one or more processors, configure the computer system to cause the one or more processors to perform actions comprising:
        receiving a video;
        performing an authentication process on individual segments of the video;
        determining, in response to authenticating a subset of the individual segments via the performing the authentication process, that the subset of the individual segments are unmodified video segments;
        causing display of the unmodified video segments on a display screen; and
        causing display of an authentication graphic on the display screen, the authentication graphic indicating that the displayed unmodified video segments are unmodified,
    wherein the subset of the individual segments is a first subset, the operations further comprising:
        determining, in response to failing to authenticate a second subset of the individual segments during the authentication process, that the second subset of the individual segments are modified video segments.

2. The computer system of claim 1, wherein the authentication graphic is provided in the form of a colored timeline positioned near a window showing the video when displayed.

3. The computer system of claim 2, wherein the colored timeline corresponds to a length of the video.

4. The computer system of claim 3, wherein the colored timeline shows a first color for a portion of the timeline corresponding to the segments of the plurality of segments that are unmodified, and a second color for another portion of the timeline corresponding to other segments of the plurality of segments that are modified.

5. The computer system of claim 1, the operations further comprising:
    determining an authenticity assessment of the video comprising one of partially authenticated, fully authentic or not authentic.

6. The computer system of claim 5, the operations further comprising:

another graphic indicating the authenticity assessment of the video.

7. The system of claim 1, the operations further comprising:
causing display of the modified video segments on the display screen,
wherein the authentication graphic indicates that the displayed modified video segments are modified.

8. The system of claim 1, wherein the performing the authentication process comprises:
comparing a first hash associated with a message digest generated upon capture of the video clip with a second hash associated with a local message digest generated based at least in part on a hashing of the individual segments of the video.

9. The system of claim 1, wherein the causing the display of the unmodified video segments comprises:
redacting a segment of the video that is determined, at least in part based on the performing the authentication process, to be modified; and
playing the video with the segment redacted.

10. The method of claim 9, wherein the graphic comprises a colored timeline positioned near a window showing the video when displayed.

11. A method comprising:
receiving a video;
determining, using an authentication process, that a first segment of the video is authentic, wherein the performing the authentication process comprises comparing a first hash associated with a message digest generated upon capture of the video clip with a second hash associated with a local message digest generated based at least in part on a hashing of the individual segments of the video;
determining, using the authentication process, a second segment of the video is inauthentic;
determining, based at least in part on determining the first segment of the video is authentic, that the first segment is an unmodified video segment;
causing display of the video on a display screen; and
causing, during display of the first segment on the display screen during the display of the video, display of a graphic indicating that the displayed first segment is an unmodified video segment.

12. The method of claim 11, wherein the graphic is a first graphic, the method further comprising:
causing, during display of the second segment on the display screen during the display of the video, display of a second graphic indicating that the displayed second segment is a modified video segment.

13. The method of claim 11, further comprising:
redacting the second segment from the video to create a redacted video,
wherein the causing display of the video on the display screen comprises causing display of the redacted video.

14. The method of claim 11, wherein the determining that the first segment of the video is authentic, comprises:
receiving metadata associated with the video;
generating, based at least in part on the metadata, a first hash of the first segment of the video;
receiving a message digest associated with the video, the message digest including at least a second hash associated with the first segment of the video, the second has being generated upon capture of the video; and
determining that the first segment of the video is authentic based at least in part on the first hash being equal to the second hash.

15. An electronic device comprising:
a display;
one or more processors; and
memory storing processor-executable instructions that, when executed by the one or more processors, configure the electronic device to cause the one or more processors to perform actions comprising:
receiving a video;
determining, using an authentication process, that a first segment of the video is authentic, wherein the performing the authentication process comprises comparing a first hash associated with a message digest generated upon capture of the video clip with a second hash associated with a local message digest generated based at least in part on a hashing of the individual segments of the video;
determining, using the authentication process, that a second segment of the video is inauthentic;
determining, based at least in part on determining the first segment of the video is authentic, that the first segment is an unmodified video segment;
causing display of the video on the display; and
causing, during display of the first segment on the display during the display of the video, display of a graphic indicating that the displayed first segment is an unmodified video segment.

16. The electronic device of claim 15, wherein the graphic is a first graphic, the operations further comprising:
causing, during display of the second segment on the display screen during the display of the video, display of a second graphic indicating that the displayed second segment is a modified video segment.

17. The electronic device of claim 15, the operations further comprising:
redacting the second segment from the video to create a redacted video,
wherein the causing display of the video on the display screen comprises causing display of the redacted video.

18. The electronic device of claim 15, wherein the determining that the first segment of the video is authentic, comprises:
receiving metadata associated with the video;
generating, based at least in part on the metadata, a first hash of the first segment of the video;
receiving a message digest associated with the video, the message digest including at least a second hash associated with the first segment of the video, the second has being generated upon capture of the video; and
determining that the first segment of the video is authentic based at least in part on the first hash being equal to the second hash.

19. The electronic device of claim 15, wherein the graphic comprises a colored timeline positioned on the display near a window showing the video when displayed.

* * * * *